United States Patent
Shimojo et al.

(10) Patent No.: US 7,593,805 B2
(45) Date of Patent: Sep. 22, 2009

(54) CONTROL SYSTEM FOR INTERNAL COMBUSTION ENGINE

(75) Inventors: Kanako Shimojo, Saitama-ken (JP); Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 11/665,855

(22) PCT Filed: Sep. 27, 2005

(86) PCT No.: PCT/JP2005/017767

§ 371 (c)(1),
(2), (4) Date: Apr. 20, 2007

(87) PCT Pub. No.: WO2006/043397

PCT Pub. Date: Apr. 27, 2006

(65) Prior Publication Data

US 2009/0070013 A1   Mar. 12, 2009

(30) Foreign Application Priority Data

Oct. 21, 2004  (JP) .............................. 2004-306568

(51) Int. Cl.
*G06F 19/00* (2006.01)
*F01L 1/34* (2006.01)
*F02B 75/12* (2006.01)

(52) U.S. Cl. ...................... 701/103; 123/90.15; 123/316

(58) Field of Classification Search ......... 701/101–104, 701/106, 110, 114, 115; 123/90.15–90.18, 123/316, 347, 348, 361, 399, 403, 406.45, 123/192.1

See application file for complete search history.

(56) References Cited

U.S. PATENT DOCUMENTS

| | | | |
|---|---|---|---|
| 6,584,956 B2 * | 7/2003 | Machida | 123/406.47 |
| 7,055,474 B2 * | 6/2006 | Machida et al. | 123/90.16 |
| 7,188,020 B2 * | 3/2007 | Yasui et al. | 701/103 |
| 7,318,018 B2 * | 1/2008 | Yasui et al. | 701/103 |

FOREIGN PATENT DOCUMENTS

JP        9-282006 A      10/1997

(Continued)

*Primary Examiner*—Willis R Wolfe, Jr.
(74) *Attorney, Agent, or Firm*—Arent Fox LLP

(57) ABSTRACT

To provide a control system for an internal combustion engine, which is capable of attaining both the securing of excellent drivability and the reduction of impact occurring when a movable part abuts against a restriction part at the same time. The control system 1 includes a variable valve lift mechanism 50 that changes a valve lift Liftin, and includes a restriction part 67a for having a movable part 65 abut thereagainst for restricting the valve lift Liftin such that it does not exceed a predetermined limit lift Liftin_L, and a variable intake air amount mechanism 11 that changes the intake air amount. The control system calculates a control input ULiftin for control of the variable valve lift mechanism 50, with a predetermined control algorithm including a disturbance suppression parameter POLE_lf (step 54), such that the valve lift Liftin follows up the target valve lift Liftin_cmd. When a determination that the movable part 65 has abutted against the restriction part 67a is made, the control system sets the disturbance suppression parameter POLE_lf such that the degree of suppression of the disturbance thereby becomes smaller than before the determination (step 73).

6 Claims, 19 Drawing Sheets

FOREIGN PATENT DOCUMENTS

| JP | 09-282006 A | 10/1997 |
| JP | 2001-303994 A | 10/2001 |
| JP | 2002-161767 A | 6/2002 |
| JP | 2003-254100 A | 9/2003 |
| JP | 2004-162663 A | 6/2004 |

* cited by examiner

FIG. 5
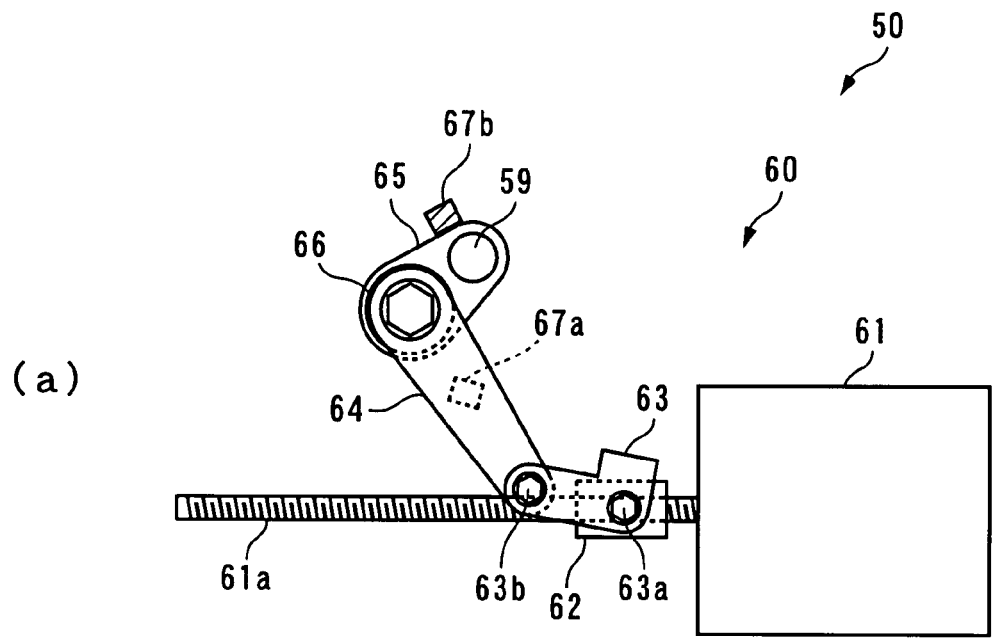
(a)
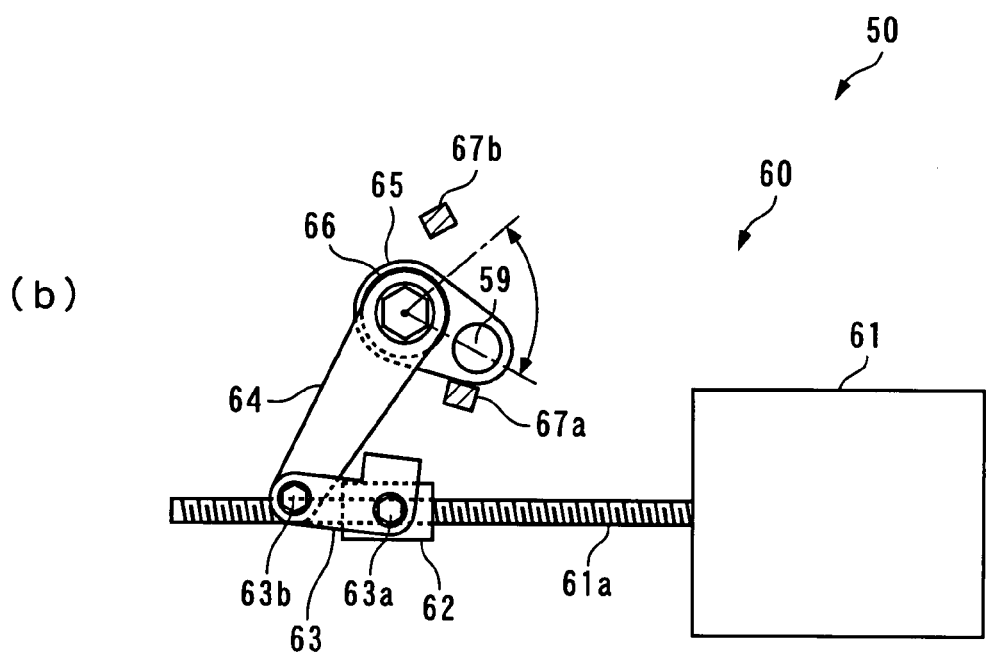
(b)

CONTROL SYSTEM FOR INTERNAL COMBUSTION ENGINE

FIELD OF THE INVENTION

The present invention relates to a control system for internal combustion engines which is equipped with a variable valve lift mechanism which changes valve lift as the lift of intake valves, while restricting the valve lift such that it does not exceed a predetermined limit lift, and a variable intake air amount mechanism that changes the air intake amount.

BACKGROUND ART

Conventionally, as a control system for internal combustion engine of this kind, one disclosed in Patent Literature 1 is known. The variable valve lift mechanism of this internal combustion engine (hereinafter referred to as "the engine") is provided for each cylinder, and continuously changes the valve lift between a predetermined minimum value and a predetermined maximum value, and comprises a drive shaft connected to a crankshaft, and a control shaft. The drive shaft is provided with a link arm and a swing cam for driving an intake valve, and the link arm and the swing cam are connected to a rocker arm provided on the control shaft.

The control shaft extends parallel with the drive shaft, and is supported by a bearing such that it is rotatable within a predetermined angle range. Further, the control shaft has a pin protruding in a radial direction, and is connected to a rotary drive mechanism, and the bearing is formed with a protrusion. When the rotary drive mechanism causes the control shaft to rotate, the relative angles of the rocker arm on the control shaft with respect to the swing cam and the link arm are changed, whereby the valve lift is changed. Further, when the control shaft rotates in a predetermined direction, the pin on the control shaft abuts against the protrusion of the bearing, whereby the rotation of the control shaft is blocked. Further, the intake pipe of the engine is provided with a throttle valve.

In the conventional control system, normally, the throttle valve is controlled to be fully open, and according to the operating condition of the engine, the valve lift is controlled via the variable valve lift mechanism, whereby the intake air amount is controlled. Further, when the engine is in a low load operating condition, the control shaft is caused to rotate until the pin abuts against the protrusion of the bearing, and is held in the state in which the pin is in abutment with the protrusion, whereby the valve lift is held at a predetermined minimum value. By controlling the opening degree of the throttle valve, the intake air amount is controlled.

In the above-described conventional control system, in controlling the valve lift, when the engine is in the low load operating condition, the control shaft is caused to rotate until the pin abuts against the protrusion of the bearing. Therefore, there is a fear that impact occurring upon the abutment deforms the pin or the protrusion. To avoid this, it is envisaged to reduce the rotational speed of the control shaft so as to reduce the impact, or provide a cushioning member on the pin or the protrusion so as to suppress the influence of the impact. However, in the former case, time taken to rotate the control shaft until the pin abuts against the protrusion, i.e. time taken to control the valve lift to the minimum value becomes longer, which results in a longer time period taken before the intake air amount converges to an appropriate value. During the time, the operating condition of the engine becomes unstable, which can degrade drivability. On the other hand, when the cushioning member is provided on the pin or the protrusion, the minimum value of the valve lift which should be obtained when the two are in contact with each other is prone to vary, which makes it impossible to carry out accurate control of the intake air amount. Further, the addition of the cushioning member increases the manufacturing costs accordingly, and the necessity of securing a space therefor degrades the degree of freedom of design.

The present invention has been made to provide a solution to the above-described problems, and an object thereof is to provide a control system for internal combustion engine, which is capable of reducing impact occurring when a movable part of a variable valve lift mechanism abuts against a restriction part, while maintaining excellent drivability.

[Patent Literature 1] Japanese Laid-Open Patent Publication (Kokai) No. 2003-254100

DISCLOSURE OF THE INVENTION

To attain the object, the invention as claimed in claim 1 provides a control system 1 for an internal combustion engine, comprising a variable valve lift mechanism 50 that changes a valve lift Liftin which is a lift of an intake valve 4 of the engine 3 by driving a movable part (short arm 65 in the embodiment (the same applies hereinafter in this section)) thereof, and includes a restriction part (minimum lift stopper 67a) for having the movable part abut thereagainst, for thereby restricting the valve lift Liftin such that the valve lift Liftin does not exceed a predetermined limit lift (minimum value Liftin_L), a variable intake air amount mechanism (throttle valve mechanism 11) that changes an intake air amount of the engine 3, operating condition-detecting means (crank angle sensor 20, engine coolant temperature sensor 21, accelerator pedal opening sensor 27, ECU 2) for detecting an operating condition of the engine 3, abutment determination means (ECU 2, steps 71 and 74 in FIG. 16) for determining whether or not the movable part is in abutment with the restriction part, control means (ECU 2, steps 31, 32, 37 to 40 in FIG. 10, FIGS. 11 to 13, steps 80, 86 to 90 and 84 in FIG. 21) for controlling the variable intake air amount mechanism based on the detected operating condition of the engine 3, when the abutment determination means determines that the movable part is in abutment with the restriction part, valve lift-detecting means (pivot angle sensor 26, ECU 2) for detecting the valve lift Liftin, target valve lift-determining means (ECU 2, step 50 in FIG. 14, FIG. 15) for determining a target valve lift Liftin_cmd, and control input-calculating means (ECU 2, step 54 in FIG. 14) for calculating a control input (lift control input Uliftin) for controlling the variable valve lift mechanism 50 with a predetermined control algorithm such that the detected valve lift Liftin follows up the determined target valve lift Liftin_cmd, wherein the predetermined control algorithm includes a disturbance suppression parameter (switching function-setting parameter POLE_lf) for suppressing influence of disturbance applied to the variable valve lift mechanism 50, and wherein the control input calculating means includes disturbance suppression parameter-setting means (ECU 2, step 73 in FIG. 16) for setting the disturbance suppression parameter such that a degree of suppression of the influence of the disturbance by the disturbance suppression parameter is made smaller when a determination that the movable part is in abutment with the restriction part is made than before the determination is made.

According to this control system for an internal combustion engine, the target valve lift-determining means determines a target valve lift, and the control input-calculating means calculates a control input for controlling the variable valve lift mechanism with a predetermined control algorithm such that the valve lift follows up the target valve lift. Further, the movable part abuts against the restriction part, whereby the valve lift is restricted such that it does not exceed a predetermined limit lift. This restricts the valve lift such that it does not exceed the limit lift when the target valve lift exceeds the limit lift. Further, the abutment determination means determines whether or not the movable part is in abutment with the restriction part, and when it is determined that the movable part is in abutment with the restriction part, the variable intake air mechanism is controlled by the control means according to the detected operating condition of the engine. As described above, when the valve lift is equal to the limit lift due to the abutment of the movable part against the restriction part, the intake air amount is controlled by controlling the variable intake air mechanism according to the operating condition of the engine.

Further, the predetermined control algorithm includes a disturbance suppression parameter for suppressing the influence of disturbance applied to the variable valve lift mechanism, and when a determination that the movable part is in abutment with the restriction part is made, the disturbance suppression parameter is set by the disturbance suppression parameter-setting means such that the degree of suppression of the influence of the disturbance by the disturbance suppression parameter is made smaller than before the determination is made.

In calculating the control input with the predetermined control algorithm such that the valve lift follows up the target valve lift, when the control algorithm includes the disturbance suppression parameter, the control input is calculated according to the disturbance suppression parameter as follows: When the disturbance suppression parameter is set such that the degree of suppression of the influence of disturbance is increased, the control input is calculated such that the driving force applied to the movable part is increased so as to secure the follow-up characteristic of the valve lift to the target valve lift while more effectively suppressing the influence of the disturbance. On the other hand, when the disturbance suppression parameter is set such that the degree of suppression of the disturbance is reduced, the control input is calculated such that the driving force applied to the movable part for causing the valve lift to follow up the target valve lift is made smaller.

Therefore, as described above, when the movable part abuts against the restriction part, by setting the disturbance suppression parameter such that the degree of suppression of the disturbance thereby becomes smaller, the driving force applied to the movable part is reduced when the movable part has begun to abut against the restriction part, and hence it is possible to reduce impact occurring when the movable part abuts against the restriction part. This makes it possible to prevent the movable part and the restriction part from being deformed, and hence to prolong the service life for the variable valve lift mechanism. Further, the driving force applied to the movable part can be secured until the movable part abuts against the restriction part, it is possible to converge the intake air amount to a desired value quickly without lowering the moving speed of the movable part. As a result, the operating condition of the engine is made stable whereby it is possible to secure excellent drivability. Further, it is not required to additionally provide the cushioning member, which makes it possible to prevent the intake air amount from being varied due to variations in the valve lift at the limit lift, differently from the case of the cushion member being provided. Further, it is possible to prevent the addition of the cushioning member from increasing the manufacturing cost and reducing the degree of freedom of design.

The invention as claimed in claim 2 is a control system for internal combustion engine 1, as claimed in claim 1, wherein the control means starts control of the variable intake air amount mechanism immediately after it is determined that the movable part has abutted against the restriction part (steps 80, 86 to 90 and 84 in FIG. 21).

With this configuration, immediately after it is determined that the movable part has abutted against the restriction part, the control of the variable intake air amount mechanism based on the operating condition of the engine is started. This causes the control of the intake air amount by the variable intake air amount mechanism to be started simultaneously when the valve lift reaches the limit lift, whereby it is possible to perform a smooth transition from the intake air amount control mainly based on the variable valve lift mechanism to the intake air amount control mainly based on the variable intake air mechanism, without interrupting the control of the intake air amount.

The invention as claimed in claim 3 is a control system for internal combustion engine 1, as claimed in claim 1 or 2, wherein the control means controls the variable intake air amount mechanism according to the detected valve lift Liftin, when it is determined that the movable part is not in abutment with the restriction part (steps 80 to 82, and 84 in FIG. 21, and FIG. 22).

With this configuration, when the movable part is in abutment with the restriction part, the variable intake air amount mechanism is controlled according to the operating condition of the engine, and in addition thereto, when the movable part is not in abutment with the restriction part, the control of the variable intake air amount mechanism based on the valve lift is carried out. With this configuration, at the time point of the valve lift reaching the limit lift, the operation amount of the variable intake air amount mechanism has already been controlled to a value suitable for the valve lift, and hence, when the control of the variable intake air amount mechanism based on the operating condition of the engine is started in accordance with the valve lift reaching the limit lift, the operation amount of the variable intake air amount mechanism can be quickly changed to a proper value without drastically changing the same. This makes it possible to smoothly change the intake air amount, and hence the torque and the rotational speed of the internal combustion engine can be smoothly changed without any step.

The invention as claimed in claim 4 is a control system for internal combustion engine 1 as claimed in any one of claims 1 to 3, wherein the predetermined control algorithm includes a predetermined two-degree-of-freedom control algorithm (step 54 in FIG. 14).

With this configuration, the control input is calculated with the control algorithm including a predetermined two-degree-of-freedom control algorithm. Therefore, e.g. in the case where the target value filter type two-degree-of-freedom control algorithm is employed as the two-degree-of-freedom control algorithm, the target value filter algorithm thereof enables the follow-up speed of the valve lift to the target valve lift to be properly set, and the feed control algorithm thereof enables the follow-up behavior of the valve lift to the target valve lift to be properly set. This makes it possible to cause the valve lift to accurately follow up the target valve lift while avoiding the occurrence of overshooting. As a result, the impact occurring when the movable part abuts against the restriction part can be positively reduced.

The invention as claimed in claim 5 is a control system for internal combustion engine 1, as claimed in any one of claims 1 to 4, further comprising hold determination means (ECU 2, step 74 in FIG. 16) for determining whether or not the valve lift Liftin is held at the predetermined limit lift after it is determined that the movable part has abutted against the restriction part, and wherein the disturbance suppression parameter-setting means sets the disturbance suppression parameter such that the degree of suppression of the influence of the disturbance by the disturbance suppression parameter is increased, when the hold determination means has determined that the valve lift Liftin is held at the predetermined limit lift (step 66 in FIG. 16).

With this configuration, when the hold determination means determines that the valve lift is held at the limit lift after the movable part abuts against the restriction part, the disturbance suppression parameter is set such that the degree of suppression of the influence of the disturbance thereby is increased. This increases the driving force applied to the movable part for causing the aforementioned valve lift to follow up the target valve lift, i.e. the force for holding the valve lift at the limit lift, after the movable part has abutted against the restriction part. As a result, after abutting against the restriction part, the movable part can be positively held in the state in abutment with the restriction part without being moved away from the restriction part by the vibration of the engine or the like. Therefore, it is possible to accurately perform the control of the intake air amount by the variable intake air amount mechanism while preventing variation in the intake air amount from being caused by the separation of the movable part from the restriction part.

The invention as claimed in claim 6 is a control system for internal combustion engine 1, as claimed in any one of claims 1 to 5, wherein the disturbance suppression parameter-setting means sets the disturbance suppression parameter such that the degree of suppression of the influence of the disturbance by the disturbance suppression parameter is increased, when at least one of the target valve lift Liftin_cmd and the valve lift Liftin is within a predetermined range defined by the predetermined limit lift and at the same time becomes equal to a value other the predetermined limit lift, after it is determined that the movable part has abutted against the restriction part (steps 61 and 66 in FIG. 16).

With this configuration, after the movable part abuts against the restriction part, and when the target valve lift and/or the valve lift are/is within the predetermined range, and at the same time becomes equal to a value other than the limit lift, the disturbance suppression parameter is set such that the degree of suppression of the influence of the disturbance thereby is increased. This causes, during execution of the control of the variable intake air amount mechanism responsive to the abutment of the movable part against the restriction part, when the control of the valve lift executed in parallel therewith causes the target valve lift and/or the valve lift to be equal to such a value mentioned above, that is, in controlling the valve lift in such a direction as will cause the movable part once having abutted against the restriction part to move away therefrom, and/or when the valve lift is actually controlled as such, it is possible to increase the driving force applied to the movable part for causing the valve lift to follow up the target valve lift, which makes it possible to improve the follow-up characteristic of the valve lift to the target valve lift.

Therefore, during a transition in which e.g. when the intake air amount is caused to be quickly changed in such a direction that the movable part is moved away from the restriction part, after the movable part has abutted against the restriction part and the valve lift has become equal to the limit lift, it is possible to cause the intake air amount to converge to a desired value quickly, which enables excellent drivability to be secured.

BRIEF DESCRIPTION OF THE DRAWINGS

[FIG. 5]
($a$) is a diagram showing a lift actuator in a state in which a short arm thereof is in contact with a maximum lift stopper, and ($b$) is a diagram showing the lift actuator in a state in which the short arm thereof is in contact with a minimum lift stopper.

BEST MODE FOR CARRYING OUT THE INVENTION

Figure 1:
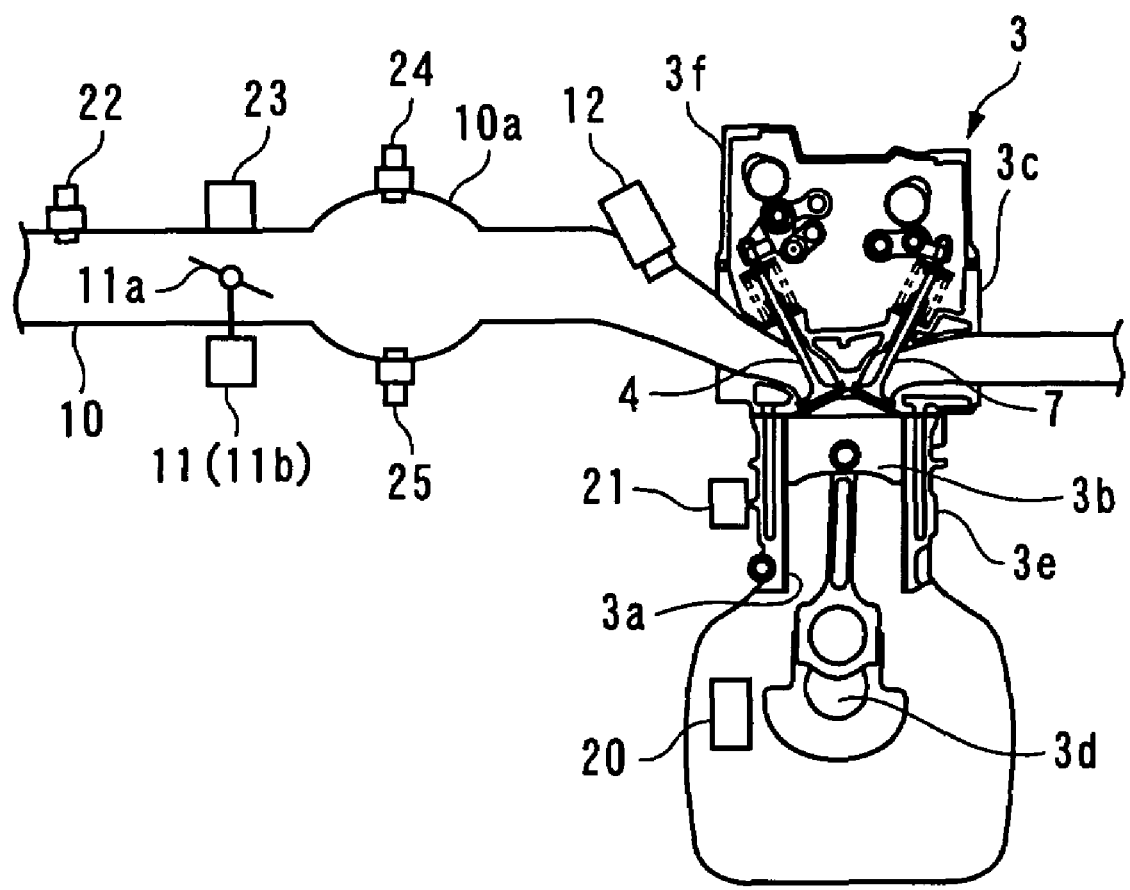
[FIG. 1]
A schematic diagram schematically showing the arrangement of an internal combustion engine to which is applied a control system according to the present invention.
Figure 3:
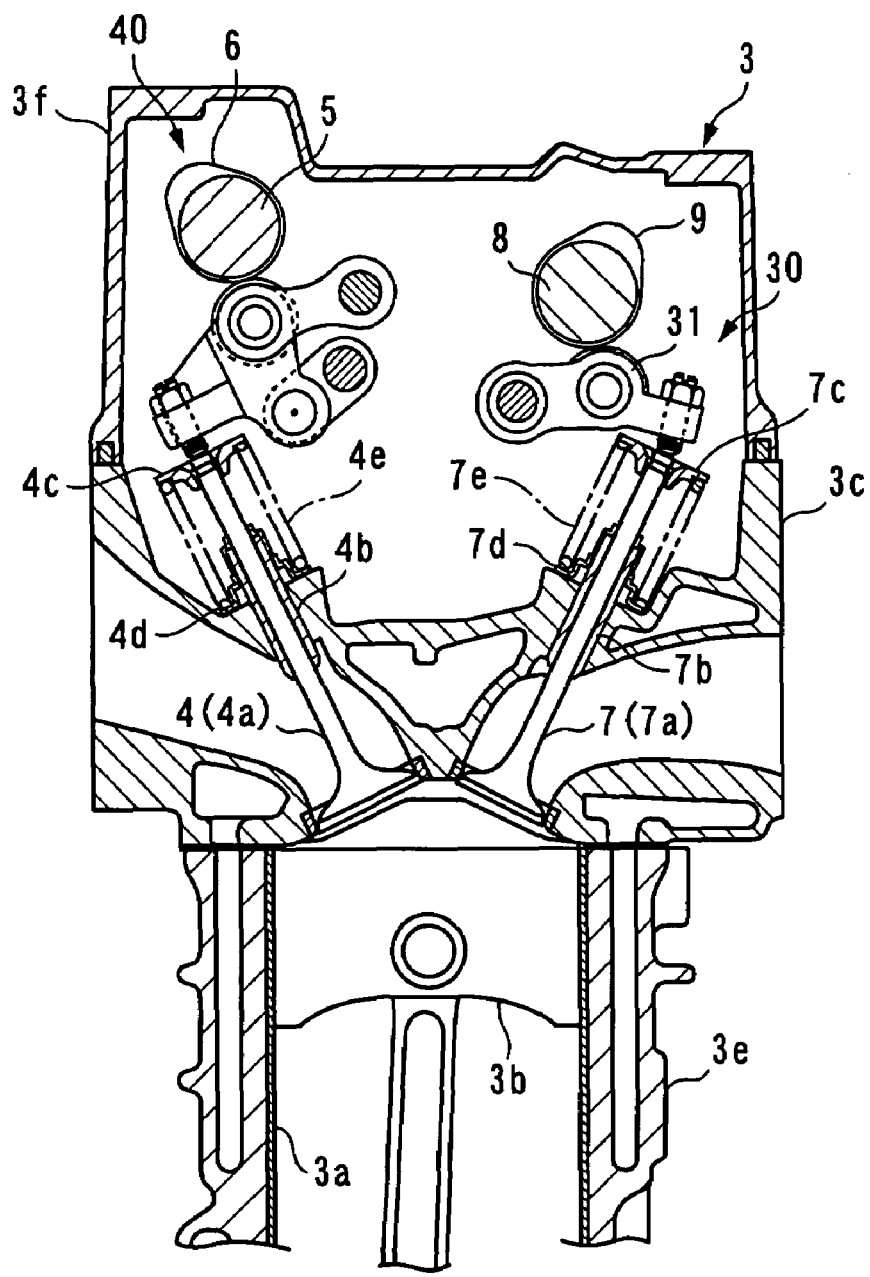
[FIG. 3]
A schematic cross-sectional view of a variable intake valve-actuating mechanism and an exhaust valve-actuating mechanism of the engine.

The present invention will now be described in detail with reference to the drawings showing a preferred embodiment thereof. FIG. 1 schematically shows the arrangement of an internal combustion engine (hereinafter simply referred to as "the engine") 3 to which is applied a control system 1 of the present invention. Referring to FIGS. 1 and 3, the engine 3 is an in-line four-cylinder DOHC gasoline engine having four cylinders 3a and pistons 3b (only one of which is shown), and installed on a vehicle (not shown). Further, the engine 3 includes an intake valve 4 and an exhaust valve 7 for opening and closing an intake port and an exhaust port of each cylinder 3a, respectively, a variable intake valve-actuating mechanism 40 having an intake camshaft 5 and intake cams 6 for actuating the intake valves 4, and an exhaust valve-actuating mechanism 30 having an exhaust camshaft 8 and exhaust cams 9 for actuating the exhaust valves 7.

The intake valve 4 has a stem 4a thereof slidably fitted in a guide 4b. The guide 4b is rigidly fixed to a cylinder head 3c. The intake valve 4 includes upper and lower spring sheets 4c and 4d, and a valve spring 4e disposed therebetween (see FIG. 4), and is urged by the valve spring 4e in the valve-closing direction.

The intake camshaft 5 and the exhaust camshaft 8 are rotatably mounted through the cylinder head 3c via holders, not shown. Further, the intake camshaft 5 has an intake sprocket coaxially fitted on one end thereof. The intake sprocket is connected to a crankshaft 3d via the intake sprocket and a timing belt (neither of which is shown). With the above configuration, the intake camshaft 5 performs one rotation per two rotations of the crankshaft 3d. The intake cam 6 is integrally formed on the intake camshaft 5 for each cylinder 3a.

The variable intake valve-actuating mechanism 40 is provided for actuating the intake valve 4 of each cylinder 3a so as to open and close the same, in accordance with rotation of the intake cam 6, and continuously changing the lift of the intake valve 4, which will be described in detail hereinafter. It should be noted that in the present embodiment, the lift of the intake valve 4 (hereinafter referred to as "the valve lift") Liftin represents the maximum stroke of the intake valve 4.

The exhaust valve 7 has a stem 7a thereof slidably fitted in a guide 7b. The guide 7b is rigidly fixed to the cylinder head 3c. Further, the exhaust valve 7 is provided with upper and lower spring sheets 7c and 7d, and a valve spring 7e disposed therebetween, and is urged by the valve spring 7e in the valve-closing direction.

The exhaust camshaft 8 has an exhaust sprocket (not shown) coaxially fixed to one end thereof, and is connected to the crankshaft 3d by the exhaust sprocket and the aforementioned timing belt, whereby the exhaust camshaft 8 performs one rotation per two rotations of the crankshaft 3d. The exhaust cam 9 is integrally formed on the exhaust camshaft 8 for each cylinder 3a.

The exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

The engine 3 is provided with a crank angle sensor 20 (operating condition-detecting means) and an engine coolant temperature sensor 21 (operating condition-detecting means). The crank angle sensor 20 is comprised of a magnet rotor and an MRE (magnetic resistance element) pickup, and delivers a CRK signal and a TDC signal, which are both pulse signals, to the ECU 2 of the control system 1, described hereinafter, in accordance with rotation of the crankshaft 3d.

The CRK signal is delivered whenever the crankshaft 3d rotates through a predetermined angle (e.g. 10°). The ECU 2 calculates the rotational speed NE of the engine 3 (hereinafter referred to as "the engine speed NE") based on the CRK signal. The TDC signal indicates that each piston 3b in the associated cylinder 3a is in a predetermined crank angle position slightly before the TDC position at the start of the intake stroke, and in the illustrated example of the four-cylinder type engine, the TDC signal is delivered whenever the crankshaft 3d rotates through a predetermined crank angle of 180°.

The engine coolant temperature sensor 21 is implemented e.g. by a thermistor, and detects an engine coolant temperature TW to deliver a signal indicative of the sensed engine coolant temperature TW to the ECU 2. The engine coolant temperature TW represents the temperature of an engine coolant circulating through a cylinder block 3e of the engine 3.

Furthermore, the engine 3 has an intake pipe 10 which is provided with an air flow sensor 22, a throttle valve mechanism 11 (variable intake air amount mechanism), a throttle valve opening sensor 23, an intake pipe absolute pressure sensor 24, an intake air temperature sensor 25, and a fuel injection valve 12, from upstream to downstream in the mentioned order.

The air flow sensor 22 is formed by a hot-wire air flow meter, and detects the amount of intake air passing through the throttle valve mechanism 11 (hereinafter referred to as "the TH passing intake air amount") Gth to deliver a signal indicative of the sensed TH passing intake air amount Gth to the ECU 2.

The throttle valve mechanism 11 includes a throttle valve 11a, and a TH actuator 11b for opening and closing the throttle valve 11a. The throttle valve 11a is arranged in the intake pipe 10 in a manner capable of performing pivotal motion, for varying the amount of intake air by a change in the pivotal motion. The TH actuator 11b is a combination of a motor, and a gear mechanism, neither of which is shown, and is driven by a control signal commensurate with a throttle control input Uth, referred to thereinafter, which is input from the ECU 2, whereby the opening of the throttle valve 11a (hereinafter referred to as "the throttle valve opening") TH is controlled. The throttle valve opening sensor 23 detects the throttle valve opening TH, and delivers a detection signal indicative of the detected throttle valve opening TH to the ECU 2.

Further, the throttle valve mechanism 11 is provided with a lock mechanism (not shown) which locks the operation of the throttle valve mechanism 11, when the throttle valve control input Uth is set to a failure-time value Uth_fs, or is not input to the throttle actuator 11b due to a disconnection. That is, the throttle valve opening TH is prevented from being changed by the throttle valve mechanism 11, but is held at the minimum value TH_L. It should be noted that the minimum value TH_L is set to set such that a predetermined failure-time intake air amount is secured when the valve lift Liftin is held at a minimum value Liftin_L (predetermined limit lift), referred to hereinafter. The failure-time intake air amount is set such that it enables the idling or starting of the engine to be properly performed during stoppage of the vehicle, and a low-speed traveling state to be maintained during travel of the vehicle.

A portion of the intake pipe 10 downstream of the throttle valve 11a forms a surge tank 10a, and the intake pipe absolute pressure sensor 24 and the intake air temperature sensor 25 are disposed in the surge tank 10a. The intake pipe absolute pressure sensor 24 is formed e.g. by a semiconductor pressure sensor, for detecting the absolute pressure within the intake pipe 10 (hereinafter referred to as "the intake pipe absolute pressure") PBA to deliver a detection signal indicative of the detected intake pipe absolute pressure PBA to the ECU 2. The intake air temperature sensor 25 is formed by a thermistor, for detecting the temperature of air within the intake pipe 10 (hereinafter referred to as "the intake air temperature") TA to deliver a detection signal indicative of the detected intake air temperature TA to the ECU 2.

The fuel injections valve 12 is for injecting fuel into the intake pipe 10, and the injection timing and injection amount of fuel are controlled by a drive signal from the ECU 2.

Figure 2:
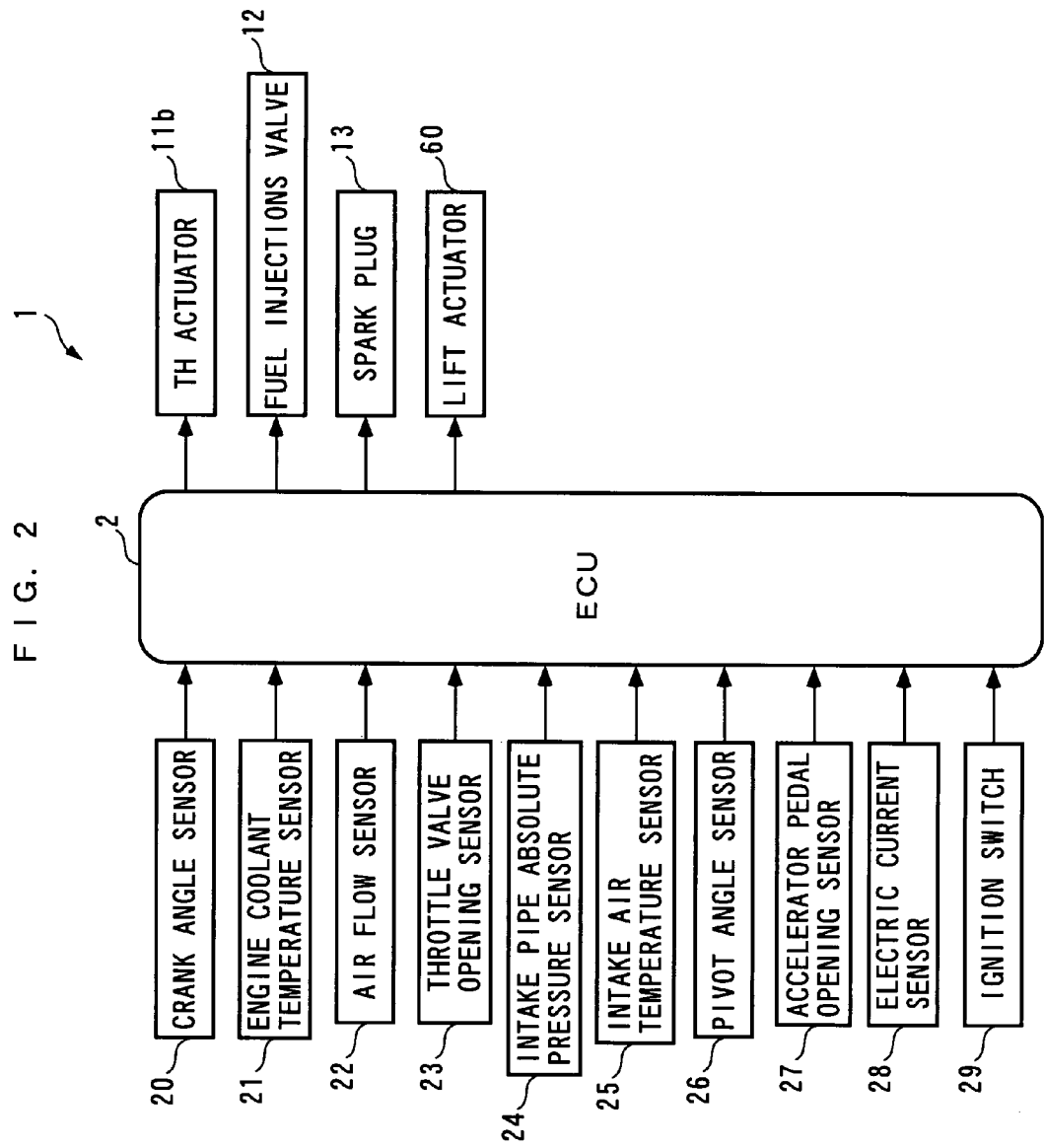
[FIG. 2]
A schematic block diagram of the control system.

Further, the cylinder head 3c of the engine has spark plugs 13 mounted therein, and the ignition timing of each spark plug is also controlled by the ECU 2 (see FIG. 2.)

Next, referring to FIGS. 4 to 7, a description will be given of the aforementioned variable intake valve-actuating mechanism 40. The variable intake valve-actuating mechanism 40 is comprised of the intake camshaft 5, the intake cams 6, and a variable valve lift mechanism 50.

The variable valve lift mechanism 50 is provided for actuating the intake valves 4 to open and close the same, in accordance with rotation of the intake cams 6, and continuously changing the valve lift Liftin between a predetermined maximum value Liftin_H and the minimum value Liftin_L. The variable valve lift mechanism 50 is comprised of rocker arm mechanisms 51 of a four joint link type, provided for the respective cylinders 3a, and a lift actuator 60 simultaneously actuating these rocker arm mechanisms 51.

Each rocker arm mechanism 51 is comprised of a rocker arm 52, and upper and lower links 53 and 54. The upper link 53 has one end pivotally mounted to a rocker arm shaft 56 fixed to the cylinder head 3c, and the other end pivotally mounted to an upper end of the rocker arm 52 by an upper pin 55.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. The adjusting bolt 52a is in contact with a stem 4e of the intake valve 4 and when the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65 (movable part), described hereinafter, of the lift actuator 60 by the connection shaft 59.

As shown in FIG. 5, the lift actuator 60, which is driven by the ECU 2, is comprised of a motor 61, a nut 62, a link 63, a long arm 64, and the short arm 65. The motor 61 is connected to the ECU 2, and disposed outside a head cover 3f of the engine 3. The rotational shaft of the motor 61 is a screw shaft 61a formed with a male screw and the nut 62 is screwed onto the screw shaft 61a. The link 63 has one end pivotally mounted to the nut 62 by a pin 63a, and the other end pivotally mounted to one end of the long arm 64 by a pin 63b. Further, the other end of the long arm 64 is attached to one end of the short arm 65 by a pivot shaft 66. The pivot shaft 66 is circular in cross section, and is pivotally supported by the head cover 3f of the engine 3. The long arm 64 and the short arm 65 are pivotally moved about the pivot shaft 66 in unison with the pivot shaft 66.

Furthermore, the aforementioned connection shaft 59 pivotally extends through an end of the short arm 65 on a side opposite to the pivot shaft 66, whereby the short arm 65 is connected to the lower link 54 by the connection shaft 59. Further, in the vicinity of the short arum 65, a minimum lift stopper 67a (restriction part) and a maximum lift stopper 67b are arranged in a manner spaced from each other. These two stoppers 67a and 67b restrict the pivotal motion range of the short arm 65b as described hereinbelow.

Next, a description will be given of the operation of the variable valve lift mechanism 50 configured as above. In the variable valve lift mechanism 50, when a lift control input Uliftin (control input), described hereinafter, is input from the ECU 2 to the lift actuator 60, the screw shaft 61a of the motor 61 rotates, and the nut 62 is moved in accordance with the rotation of the screw shaft 61a, whereby the long arm 64 and the short arm 65 are pivotally moved about the pivot shaft 66, and in accordance with the motion of the connecting shaft 59 caused by the pivotal motion of the short arm 65, the lower link 54 of the rocker arm mechanism 51 is pivotally moved about the lower pin 58. That is, the lower link 54 is driven by the lift actuator 60.

Figure 4:
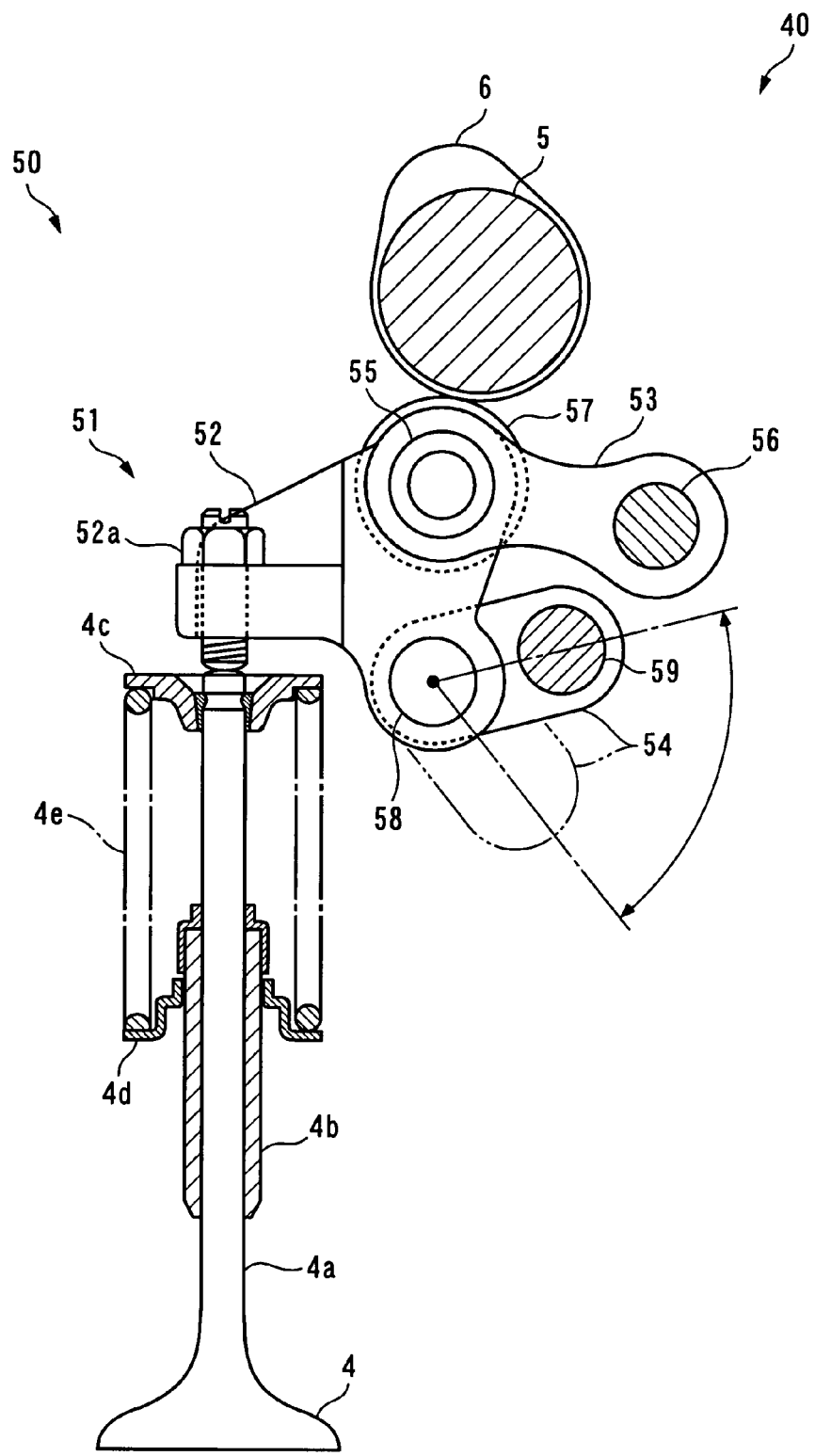
[FIG. 4]
A schematic cross-sectional view of a variable valve lift mechanism of the variable intake valve-actuating mechanism.
Figure 6:
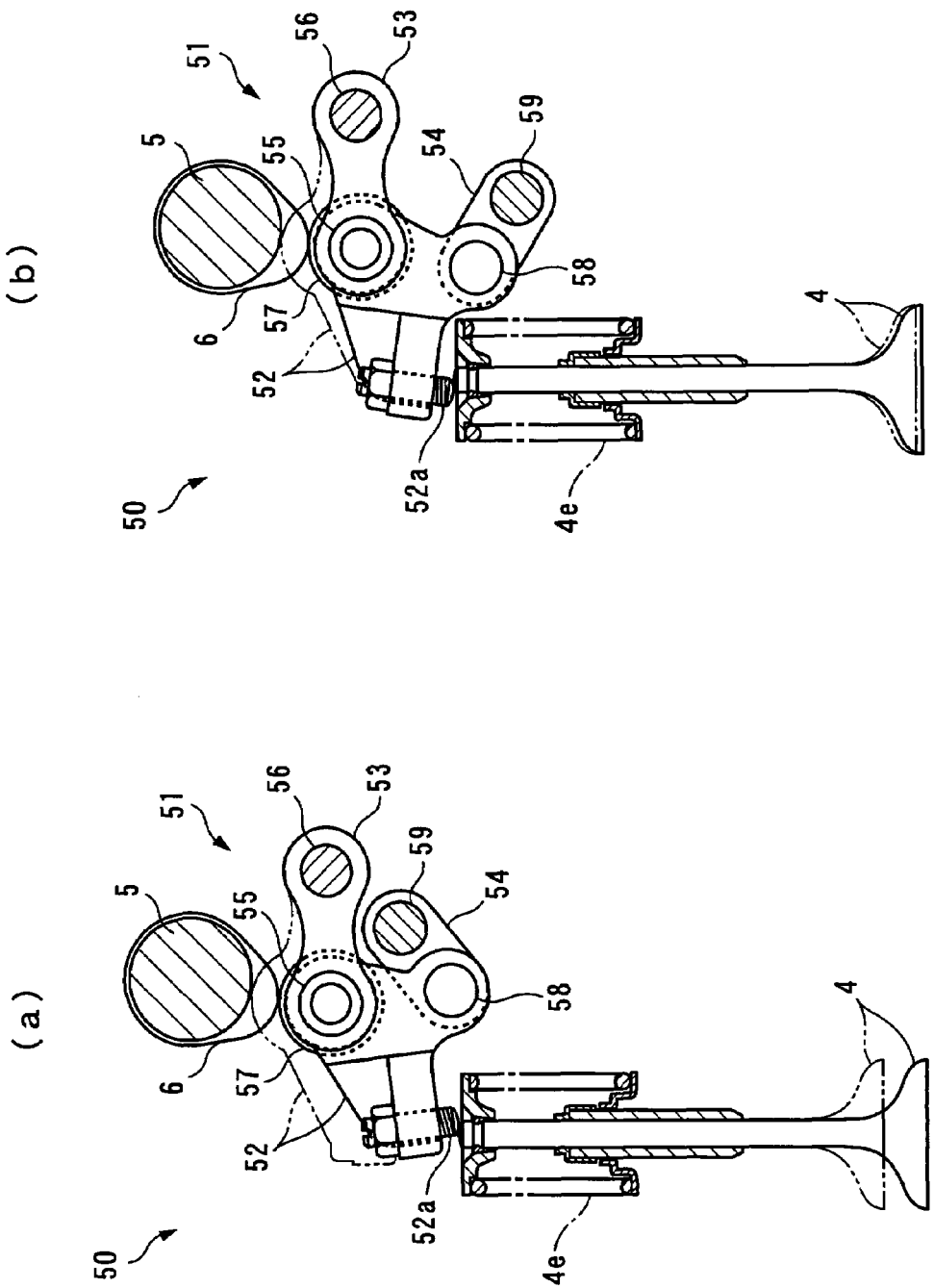
[FIG. 6]
($a$) is a diagram showing an intake valve placed in an open state when a lower link of the variable valve lift mechanism is in a maximum lift position, and ($b$) is a diagram showing the intake valve placed in an open state when the lower link of the variable valve lift mechanism is in a minimum lift position.
Figure 7:
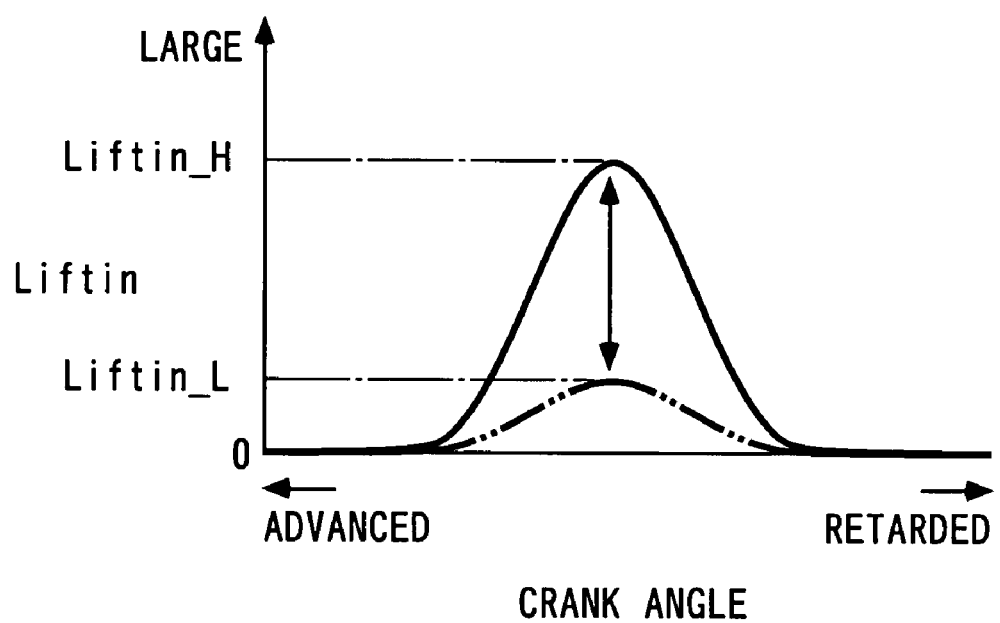
[FIG. 7]
A diagram showing a valve lift curve (solid line) obtained when the lower link of the variable valve lift mechanism is in the maximum lift position, and a valve lift curve (two-dot chain line) obtained when the lower link of the variable valve lift mechanism is in the minimum lift position.

As shown in FIG. 5(a), when the short arm 65 is pivotally moved counterclockwise as viewed in the figure, the short arm 65 is brought into abutment with the maximum lift stopper 67b and stopped thereat, whereby the lower link 54 is also stopped at the maximum lift position shown by a solid line in FIG. 4. On the other hand, as shown in FIG. 5(b), when the short arm 65 is pivotally moved clockwise, the short arm 65 is brought into abutment with the minimum lift stopper 67a and stopped thereat, whereby the lower link 54 is also stopped at the minimum lift position shown by a two-dot chain line in FIG. 4.

As described above, under the control of the ECU 2, the range of pivotal motion of the short arm 65 is restricted by the two stoppers 67a and 67b between the maximum lift position shown in FIG. 5(a) and the minimum lift position shown in FIG. 5(b), whereby the range of pivotal motion of the lower link 54 is also restricted between the maximum lift position indicated by the solid line in FIG. 4 and the minimum lift position indicated by the two-dot chain line.

The rocker arm mechanism 51 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6(a), when the intake cam 6 rotates, the amount of movement of the adjusting bolt 52a becomes larger than the amount of movement of a contact point where the intake cam 6 and the roller 57 are in contact with each other.

On the other hand, the rocker arm mechanism 51 is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6(b), when the intake cam 6 rotates, the amount of movement of the adjusting bolt 52a becomes smaller than the amount of movement of the contact point where the intake cam 6 and the roller 57 are in contact with each other.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftin_H. On the other hand, when the lower link 54 is in the minimum lift position, the intake valve 4 is opened according to a valve lift curve indicated by a two-dot chain line in FIG. 7, and the valve lift Liftin assumes its minimum value Liftin_L.

As described above, in the variable valve lift mechanism 50, the lower link 54 is pivotally moved by the lift actuator 60 between the maximum lift position and the minimum lift position, whereby it is possible to steplessly change the valve lift Liftin between the maximum value Liftin_H and the minimum value Liftin_L.

Further, the variable valve lift mechanism 50 is provided with a lock mechanism (not shown) which locks the operation of the variable valve lift mechanism 50 when the lift control input Uliftin is set to a failure-time value Uliftin_fs, referred to hereinafter, or when the lift control input Uliftin is not input due to a disconnection. More specifically, the variable valve lift mechanism 50 is inhibited from changing the valve lift Liftin, whereby the valve lift Liftin is held at the minimum value Liftin_L. It should be noted that when the throttle valve opening TH is held at the aforementioned minimum value TH_L, the minimum value Liftin_L is set to such a value as will ensure the aforementioned failure-time intake air amount.

The engine 3 is provided with a pivot angle sensor 26 (valve lift detecting means) (see FIG. 2). The pivot angle sensor 26 detects a pivot angle θ lift of the short arm 65 and delivers a signal indicative of the detected pivot angle of the short arm 65 to the ECU 2. The pivot angle θ lift of the short arm 65 indicates a position of the short arm 65 between the maximum lift and the minimum lift. The ECU 2 calculates the valve lift Liftin based on the pivot angle θ lift.

Further, as shown in FIG. 2, an accelerator pedal opening sensor 27 (operating condition-detecting means) delivers a signal indicative of a stepped-on amount of an accelerator pedal, not shown, of the vehicle (hereinafter referred to as "the accelerator pedal opening") AP to the ECU 2, and an electric current sensor 28 delivers a detection signal indicative of the value of electric current actually flowing through the motor 61 of the lift actuator 60 (hereinafter referred to as "the current value") Imot to the ECU 2.

Next, as shown in FIG. 2, the vehicle is provided with an ignition switch (hereinafter referred to as "the IG•SW") 29. The IG•SW 29 is turned on or off by the operation of an ignition key, not shown, and delivers a signal indicative of the ON/OFF state thereof to the ECU 2.

The ECU 2 is implemented by a microcomputer including a CPU, a RAM b, a ROM, and an I/O interface circuit (neither of which is shown), and the RAM maintains data stored therein by a backup power supply even after the IG•SW 29 is turned off. The ECU 2 determines operating conditions of the engine 3, based on the detection signals delivered from the above-mentioned sensors and switch 20 to 29, and the like, and controls the valve lift Liftin and the throttle valve opening TH to thereby control the intake air amount. It should be noted that in the present embodiment, the ECU 2 forms the operating condition-detecting means, abutment determination means, control means, valve lift-detecting means, target valve lift-determining means, control input-calculating means, disturbance suppression parameter-setting means, and hold determination means.

It should be noted that the control of the above intake air amount is executed mainly by the valve lift Liftin when the engine 3 is in a low-to-high load operating condition. Further, during a very low-to-low load operating condition, the intake air amount is inherently small, and hence it is required to control the intake air amount in a fine-grained manner. Therefore, the control of the intake air amount is executed by controlling the throttle valve opening TH in a state where the valve lift Liftin is held at the minimum value Liftin_L.

Figure 8:
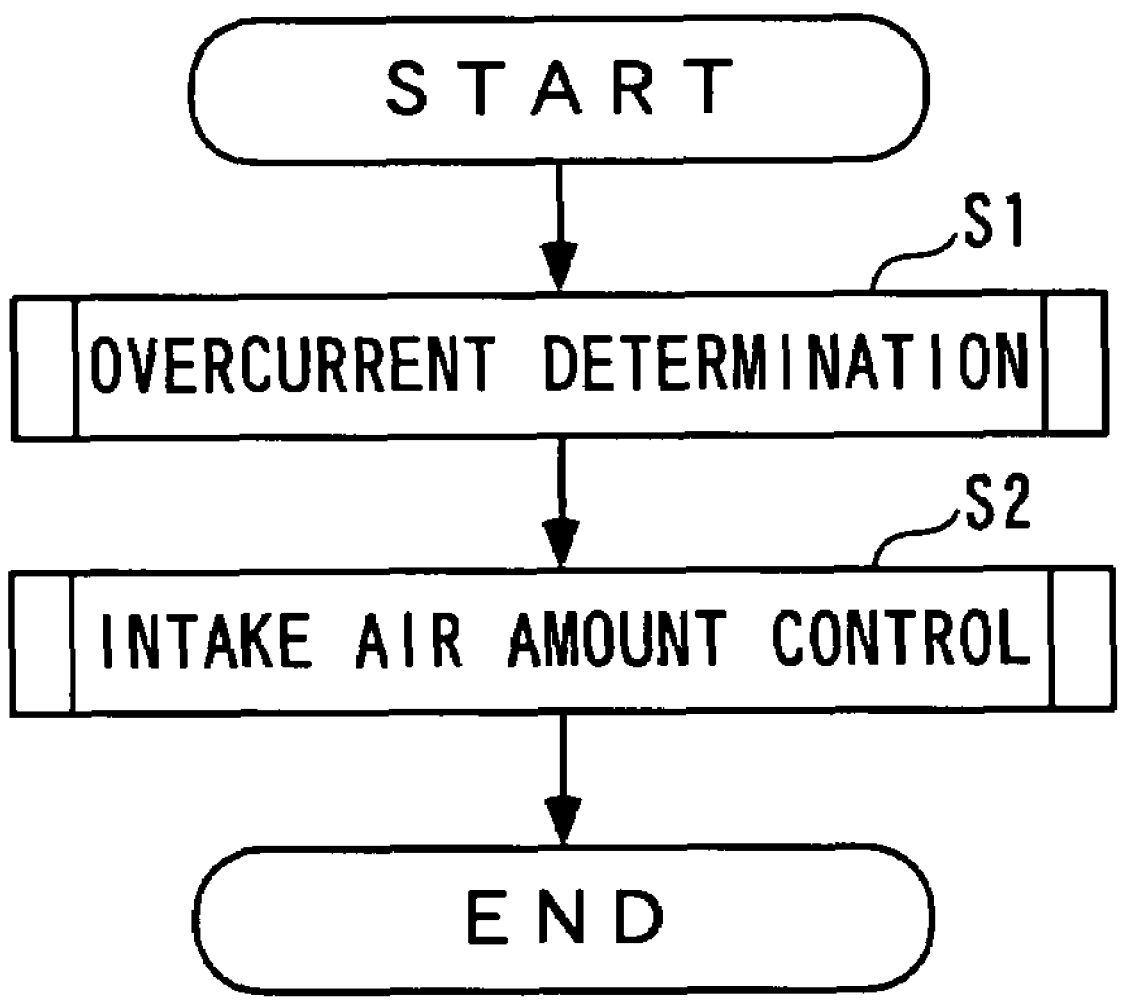
[FIG. 8]
A flowchart showing a process including an intake air amount control process, which is executed by an ECU of the control system.

Next, referring to FIG. 8, a description will be given of a process including the above-mentioned control of the intake air amount, which is executed by the ECU 2. The present process is executed whenever a predetermined control period ΔT (e.g. 5 msec) elapses. First, in a step 1, an overcurrent determination process is executed. This process determines whether the motor 61 of the lift actuator motor 60 is in an overcurrent state, i.e. in a excessively loaded state, due to undesired fixture or failure of a movable part of the variable valve lift mechanism 50. Then, depending on the result of the overcurrent determination process, an intake air amount control process is executed (step 2), followed by terminating the present process.

Figure 9:
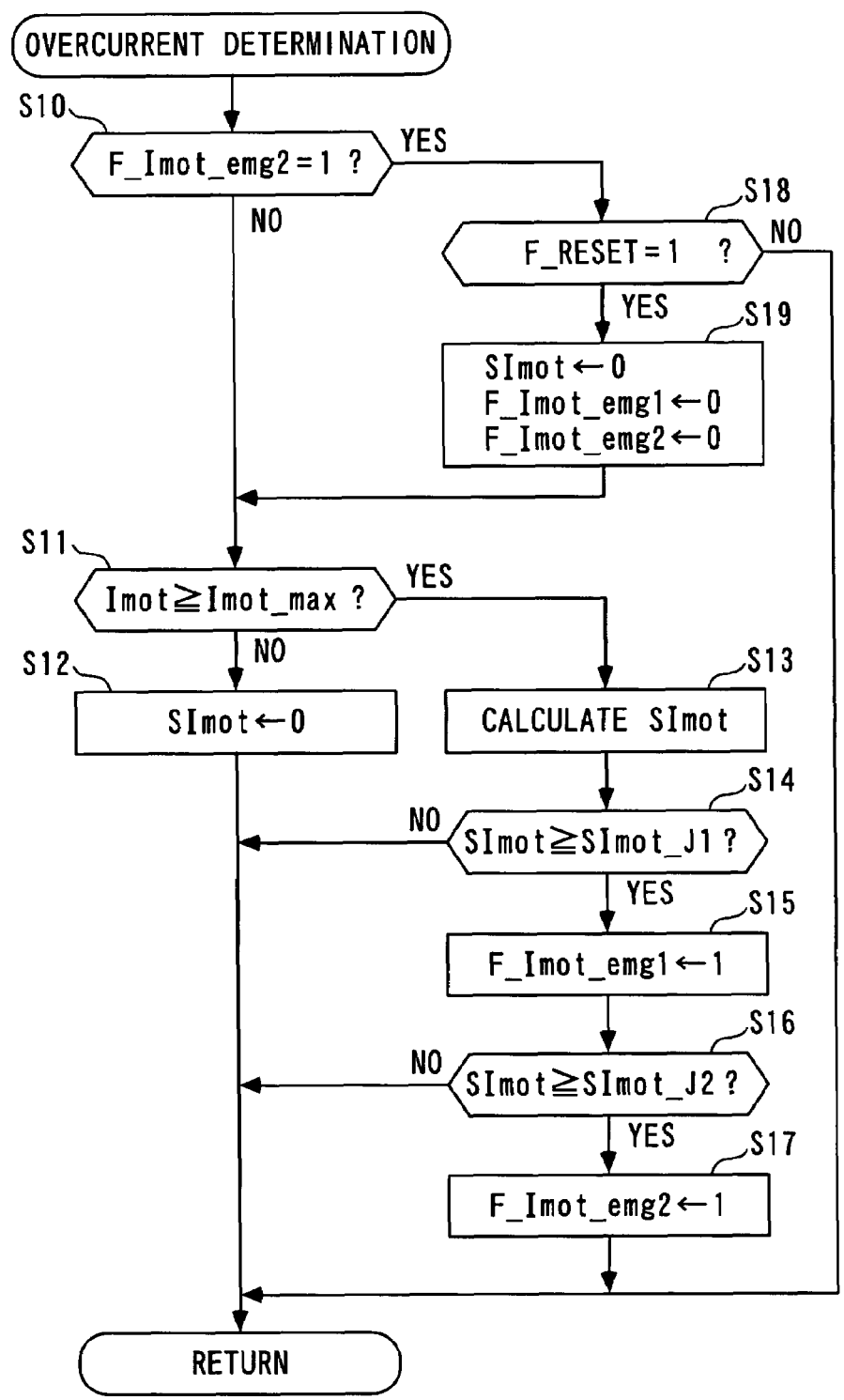
[FIG. 9]
A flowchart showing an overcurrent determination process in FIG. 8.

Next, a description will be given of the aforementioned overcurrent determination process, with reference to FIG. 9. First, in a step 10, it is determined whether or not the second overcurrent determination flag F_Imot_emg2 is equal to 1. If the answer to this question is negative (NO), it is determined whether or not the current value Imot is not less than an upper limit value Imot_max (step 11).

If the answer to this question is negative (NO), i.e. if Imot<Imot_max holds, it is judged that the lift actuator 60 is not in the overcurrent/overloaded state, a cumulative value Simot is set to a value of 0 (step 12), followed by terminating the present process.

On the other hand, if the answer to the question of the step S11 is affirmative (YES), i.e. Imot≧Imot_max holds, the-cumulative value SImot is calculated by the following equation (1) (step 13), and is stored in the RAM.

$$SImot(k) = SImot(K - 1) + Imot(k) \cdot Stime \qquad (1)$$

In the equation (1), Stime represents a sampling period, which in the present case is equal to the control period ΔT. Each discrete data with a symbol (k) represents data sampled (or calculated) in synchronism with the control period ΔT. The symbol k represents a position in the sequence of sampling cycles of discrete data. For example, the symbol k indicates that discrete data therewith is a value sampled in the current control timing, and a symbol k−1 indicates that discrete data therewith is a value sampled in the immediately preceding control timing. This also applies to the following discrete data. It should be noted that in the following description, the symbol k and the like provided for the discrete data are omitted as deemed appropriate.

As shown in the equation (1), the cumulative value SImot is calculated by cumulative calculation of the product of the current value Imot and the sampling period Stime. In this case, the current value Imot is in proportional relationship with the torque of the motor 61 of the lift actuator 60, i.e. load thereon, and hence the cumulative value Simot represents the magnitude of load on the lift actuator 60 and its duration.

Next, it is determined whether or not the cumulative value SImot is not less than a first predetermined reference value Simot_J1 (step 14). The first predetermined reference value Simot_J1 is a threshold value with reference to which it is determined whether or not the lift actuator 60 is in a condition close to the overcurrent/overloaded state. If the answer to this question is negative (NO), the present process is immediately terminated, whereas if the answer to the question of the step 14 is affirmative (YES), i.e. if Simot≧Simot_J1 holds, it is judged that the lift actuator 60 is in a condition close to the overcurrent/overloaded state, to indicate the above condition of the lift actuator 60, the first overcurrent determination flag F_Imot_emg1 is set to 1 (step 15), and is stored in the RAM.

Next, it is determined whether or not the cumulative value Simot is not less than a second predetermined reference value Simot_J2 (step 16). The second predetermined reference value Simot_J2 is a threshold value with reference to which it is determined whether or not the lift actuator 60 is in the overcurrent/overloaded state, i.e. whether or not the variable valve lift mechanism 50 is faulty, and is set to a value more than the first predetermined reference value Simot_J1.

If the answer to the question of the step 16 is negative (NO), the present process is immediately terminated, whereas if the answer to the question of the step 16 is affirmative (YES), i.e. if Simot≧Simot_J2 holds, it is judged that the lift actuator 60 is in the overcurrent/overloaded state, and the variable valve lift 50 is faulty, to indicate the fact, the second overcurrent determination flag F_Imot_emg2 is set to a value of 1 and is stored in the RAM (step 17), followed by terminating the present process.

When the second overcurrent determination flag F_Imot_emg2 is set to 1, as described above, the answer to the question of the step 10 becomes affirmative (YES), and hence it is determined whether or not a reset flag F_RESET is equal to 1 (step 18). The reset flag F_RESET is set to 1 in a predetermined determination process when a predetermined reset condition is satisfied. More specifically, when a reset operation is executed by an external diagnosis apparatus or a battery canceling operation is executed, during maintenance, it is determined the predetermined reset condition is satisfied, so that the reset flag F_RESET is set to 1.

If the answer to the question of the step 18 is negative (NO), the present process is immediately terminated, whereas if the answer to the question of the step 18 is affirmative (YES), the cumulative value Simot is set to a value of 0, and the two flags F_Imot_emg1 and F_Imot_emg2 are both reset to 0 (step 19), followed by executing the step 11 et seq.

Next, the intake air amount control process in the step 2 in FIG. 8 will be described with reference to FIG. 10. The present process is executed for calculating the lift control input Uliftin and the throttle control input Uth so as to control the intake air amount. First, it is determined whether or not an engine start flag F_ENGSTART is equal to 1. The engine start flag F_ENGSTART is set to 1 when it is determined in a determination process, according to the engine speed NE and the output of the IG•SW 29, that the engine is being started, i.e. being cranked.

Figure 11:
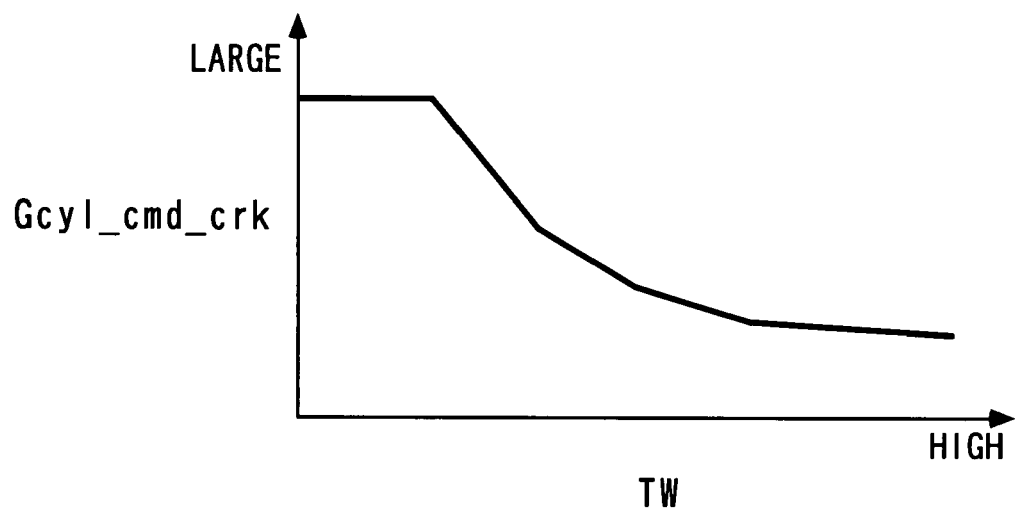
[FIG. 11]
A diagram showing, by way of example, a table for use in calculating a start-time value Gcyl_cmd_crk of the target intake air amount, which is used in the FIG. 10 process.

If the answer to the question of the step 30 is affirmative (YES), i.e. if the engine starting control is being executed, a start-time value Gcyl_cmd_crk of the target intake air amount is calculated by searching a table shown in FIG. 11 according to the engine coolant temperature TW (step 31). As shown in the figure, in this table, the start-time value Gcyl_cmd_crk of the target intake air amount is set to a larger value as the engine coolant temperature TW is lower. This is because as the engine coolant temperature TW is lower, the friction of the engine is larger, and the engine 3 is more difficult to start, and hence it is required to increase the intake air amount.

Subsequently, the target intake air amount Gcyl_cmd is set to the start-time value Gcyl_cmd_crk (step 32). Next, as described hereinafter, a valve lift control process is executed (step 33), and a throttle control process is executed (step 34), followed by terminating the present process.

On the other hand, if the answer to the question of the step 30 is negative (NO), i.e. if the engine starting control is not being executed, it is determined whether or not the accelerator opening AP is smaller than a predetermined value APREF (step 35). If the answer to the question is affirmative (YES), i.e. if the accelerator pedal is not stepped on, it is determined whether or not a timer value Tcat of a catalyst warmup timer is smaller than a predetermined value Tcatlmt (step 36). This catalyst warmup timer counts time over which the catalyst warmup control is being executed, and is formed by an upcount timer. It should be noted that the catalyst warmup control process is executed for activating a catalyst, not shown, disposed in an exhaust pipe, not shown, for reducing emissions from the engine 3.

Figure 12:
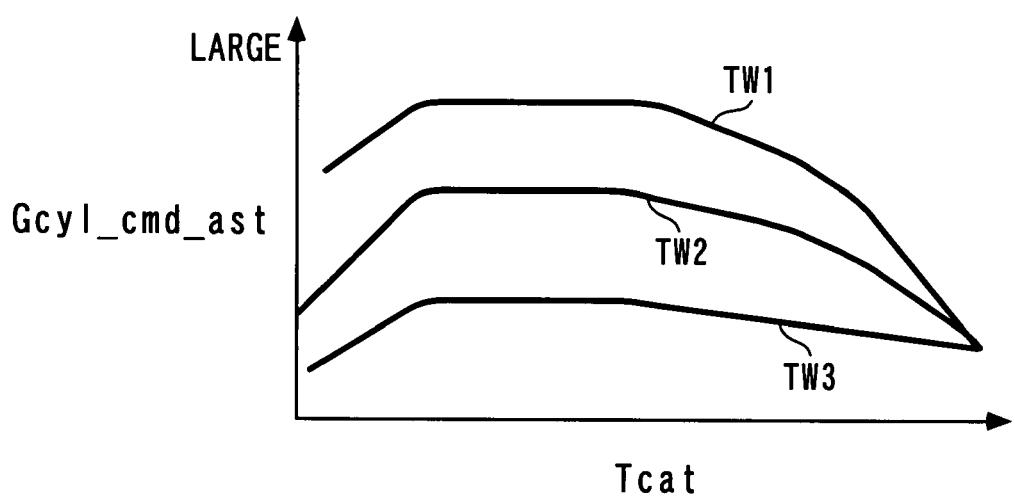
[FIG. 12]
A diagram showing, by way of example, a map for use in calculating a catalyst warmup value Gcyl_cmd_ast of the target intake air amount, which is used in the FIG. 10 process.

If the answer to the question of the step 36 is affirmative (YES), if Tcat<Tcatlmt holds, i.e. during execution of the catalyst warmup control, by searching a map shown in FIG. 12 according to the timer value Tcat of the catalyst warmup timer and the engine coolant temperature TW, a catalyst warmup control value Gcyl_cmd_ast of the target intake air amount is calculated (step 37). In the figure, TW1 to TW3 represent predetermined values of the engine coolant temperature TW set such that the relationship of TW1<TW2<TW3 holds. It should be noted that the catalyst warmup control value Gcyl_cmd_ast of the target intake air amount is calculated by interpolation, when the engine coolant temperature TW is equal to a value other than the first to third predetermined values TW1 to TW3.

Further, the catalyst warmup value Gcyl_cmd_ast of the target intake air amount is set to a larger value as the engine coolant temperature TW is lower. This is because as the engine coolant temperature TW is lower, it inherently takes a longer time period to activate the catalyst, and hence the volume of exhaust gasses is increased to shorten the time period required for activating the catalyst. Furthermore, in the above map, in a region where the timer value Tcat of the catalyst warmup timer is small, the catalyst warmup value Gcyl_cmd_ast of the target intake air amount is set to a larger value as the timer value Tcat is larger, and in a region where the timer value Tcat is large, the catalyst warmup value Gcyl_cmd_ast is set to a smaller value as the timer value Tcat is larger. This is because as the time over which the catalyst warmup control is executed becomes longer, the warming up of the engine 3 proceeds to reduce the friction, so that in such a case, unless the target intake air amount Gcyl_cmd is reduced, the ignition timing is excessively retarded so as to hold the engine speed NE at a target value, which makes unstable the combustion state of the engine.

Then, the target intake air amount Gcyl_cmd is set to the above catalyst warmup value Gcyl_cmd_ast (step 38), and then, the aforementioned step 33 et seq. are carried out.

Figure 13:
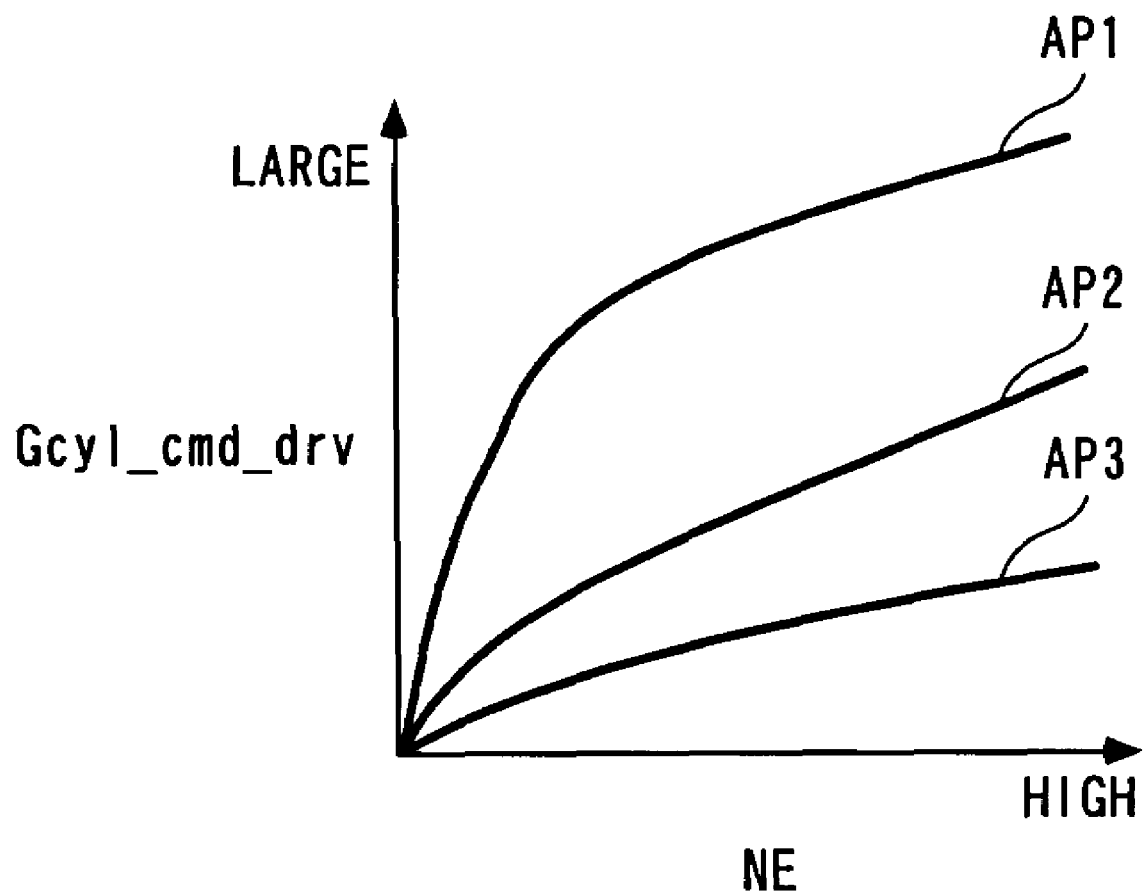
[FIG. 13]
A diagram showing, by way of example, a map for use in calculating a normal operation value Gcyl_cmd_drv of the target intake air amount, which is used in the FIG. 10 process.

On the other hand, if the answer to the question of the step 35 or the step 36 is negative (NO), i.e. if the accelerator pedal is stepped on or if Tcat≧Tcatlmt holds, a normal operation value Gcyl_cmd_drv of the target intake air amount is calculated by searching a map shown in FIG. 13 according to the engine speed NE and the accelerator pedal opening AP (step 39). In FIG. 13, AP1 to AP3 represent first to third predetermined values (AP1>AP2>AP3) of the accelerator pedal opening AP. It should be noted that the normal operation value Gcyl_cmd_drv of the target intake air amount is calculated by interpolation, when the accelerator pedal opening AP is equal to a value other than the first to third predetermined values AP1 to AP3.

In this map, the normal operation value Gcyl_cmd_drv of the target intake air amount is set to a larger value as the engine speed NE is higher or as the accelerator pedal opening AP is larger. This is because as the engine speed NE is higher or as the accelerator pedal opening AP is larger, the load on the engine 3 is higher, and hence a larger intake air amount is required.

Subsequently, the target intake air amount Gcyl_cmd is set to the normal operation value Gcyl_cmd_drv (step 40) and thereafter, the aforementioned step 33 et seq. are executed.

Next, the valve lift control process in the step 33 in FIG. 10 will be described with reference to FIG. 14. This process is for calculating the aforementioned lift control input Uliftin for controlling the variable valve lift mechanism 50. First, in a step 50, a target valve lift Liftin_cmd as a target value of the valve lift Liftin is calculated by searing a map shown in FIG. 15 according to the engine speed NE, and the target intake air amount Gcyl_cmd set in the step 32, 38 or 40. In this map, Gcyl_cmd1 to Gcyl_cmd3 represent first to third predetermined values (Gcyl_cmd1<Gcyl_cmd2<Gcyl_cmd3) of the target intake air amount Gcyl_cmd. It should be noted that the target valve lift Liftin_cmd is determined by interpolation when the target intake air amount Gcyl_cmd is equal to a value other than the first to third predetermined values Gcyl_cmd1 to Gcyl_cmd3.

Further, in this map, the target valve lift Liftin_cmd is set to a larger value as the engine speed NE is higher, or as the target intake air amount Gcyl_cmd is larger. This is because as the engine speed NE is higher, or as the target intake air amount Gcyl_cmd is larger, the output required of the engine 3 is larger, and hence a larger intake air amount is required. Further, when the target intake air amount Gcyl_cmd is equal to the first predetermined value Gcyl_cmd1, and at the same time, the engine speed NE is equal to a predetermined value NEREF (e.g. 1100 rpm), the target valve lift Liftin_cmd is set to a predetermined value Liftin_stb slightly larger than the aforementioned minimum value Liftin_L of the valve lift Liftin. Further, when Gcyl_cmd=Gcyl_cmd1 and NE<NEREF holds, that is, when the engine 3 is in the very low-to-low load operating condition, the target valve lift Liftin_cmd is set to a value slightly smaller than the minimum value Liftin_L. This is to cause the short arm 65 to be positively brought into the minimum lift stopper 67a to thereby positively hold the valve lift Liftin at the minimum value Liftin_L when the engine 3 is in the very low-to-low load operating condition, irrespective of the differences between individual products of the short arm 65 and the minimum lift stoppers 67a manufactured by mass production or aging of the same.

Then, it is determined whether or not the aforementioned second overcurrent flag F_Imot_emg2 is equal to 1 (step 51). If the answer to the question of the step 51 is affirmative (YES), i.e. if the variable valve lift mechanism 50 is faulty, the lift control input U_Liftin is set to the predetermined failure-time value U_Liftin_fs (step 52), followed by terminating the present process. As a result, as described above, the valve lift Liftin is held at the minimum value Liftin_L, whereby it is possible to suitably carry out idling or starting of the engine 3 during stoppage of the vehicle, and at the same time maintain the low-speed traveling state during travel of the vehicle.

On the other hand, if the answer to the question of the step 51 is negative (NO), i.e. if F_Imot_emg2=0 holds, in other words, if the variable valve lift mechanism is normal, an abutment determination process, described hereinafter, is executed (step 53), and the lift control input Uliftin is calculated (step 54), followed by terminating the present process.

The calculation of the lift control input Uliftin is executed based on the valve lift Liftin and the target valve lift Liftin_cmd calculated in the step 50 with a target value filter-type two-degree-of-freedom sliding mode control algorithm represented by the following equations (2) to (8). That is, the lift control input Uliftin is calculated as a value for causing the valve lift Liftin to follow up and converge to the target valve lift Liftin_cmd.

[Math. 1]

$$\text{Liftin\_cmd\_f}(k) = \\ -\text{POLE\_f\_lf} \cdot \text{Liftin\_cmd\_f}(k-1) + (1 + \text{POLE\_f\_lf}) \cdot \text{Liftin\_cmd}(k) \quad (2)$$

$$Uliftin(k) = \text{Ueq\_lf}(k) + \text{Urch\_lf}(k) + \text{Uadp\_lf}(k) \quad (3)$$

$$\text{Ueq\_lf}(k) = \frac{1}{b1\_lf}\{(1 - a1\_lf - \text{POLE\_lf}) \cdot Liftin(k) + \\ (\text{POLE\_lf} - a2\_lf) \cdot Liftin(k-1) - b2\_lf \cdot Uliftin(k-1) + \\ \text{Liftin\_cmd\_f}(k) + (\text{POLE\_lf} - 1) \cdot \text{Liftin\_cmd\_f}(k-1) - \\ \text{POLE\_lf} \cdot \text{Liftin\_cmd\_f}(k-2)\} \quad (4)$$

$$\text{Urch\_lf}(k) = -\frac{\text{Krch\_lf}}{b1\_lf} \cdot \sigma\_lf(k) \quad (5)$$

$$\sigma\_lf(k) = E\_lf(k) + \text{POLE\_lf} \cdot E\_lf(k-1) \quad (6)$$

$$E\_lf(k) = Liftin(k) - \text{Liftin\_cmd\_f}(k-1) \quad (7)$$

$$\text{Uadp\_lf}(k) = -\frac{\text{Kadp\_lf}}{b1\_lf} \cdot \sum_{i=0}^{k} \sigma\_lf(i) \quad (8)$$

In the control algorithm, first, a filtered value Liftin_cmd_f of the target valve lift is calculated with a target value filter algorithm, i.e. a first-order lag filter algorithm expressed by the equation (2). In the equation (2), POLE_f_lf represents a target value filter-setting parameter which is set, in the abutment determination process in the step 53, to a value which satisfies the relationship of −1<POLE_f_lf<0.

Next, the Lift control input Uliftin is calculated with a sliding mode control algorithm expressed by the equations (3) to (8). That is, as shown in the equation (3), the Lift control input Uliftin is calculated as the sum of an equivalent control input Ueq_lf, a reaching law input Urch_lf, and an adaptive law input Uadp_lf.

The equivalent control input Ueq_lf is calculated by the equation (4). In the equation (4), a1_lf, a2_lf, b1_lf, and b2_lf represent model parameters of a plant model expressed by an equation (9), referred to hereinafter, which are set to respective predetermined values. Further, POLE_lf is a switching function-setting parameter (disturbance suppression parameter), and is set, in the abutment determination process, to a value satisfying the relationship of $-1<$POLE_lf$<0$.

Further, the reaching law input Urch_lf is calculated by the equation (5). In the equation (5), Krch_lf represents a predetermined reaching law gain. The symbol $\sigma$_lf represents a switching function defined as in the equation (6). E_lf in the equation (6) is a follow-up error calculated by the equation (7). Further, the adaptive law input Uadp_lf is calculated by the equation (8). In the equation (8), Kadp_lf represents a predetermined reaching law gain.

The above equations (2) to (8) are derived as follows: A plant is defined as a system to which is inputted the lift control input Uliftin and from which is outputted the valve lift Liftin as the controlled variable, and is a modeled into a discrete-time system model, whereby the following equation (9) is obtained.

When the target value filter-type two-degree-of-freedom sliding mode control theory is applied to the model defined by the equation (9) such that the valve lift Liftin follows up and converges to the target valve lift Liftin_cmd, the aforementioned equations (2) to (8) are derived.

[Math. 2]

$$Liftin(k+1) = a1\_lf \cdot Liftin(k) + a2\_lf \cdot Liftin(k-1) + b1\_lf \cdot Uliftin(k) + b2\_lf \cdot Uliftin(k-1) \quad (9)$$

In the aforementioned target value filter-type two-degree-of-freedom sliding mode control algorithm has the following characteristics: By changing the target filter-setting parameter POLE_f_lf within a range of $-1<$POLE_f_lf$<0$, the follow-up speed of the filtered value Liftin_cmd_f of the target valve lift to the target valve lift Liftin_cmd, i.e. the follow-up seeped of the valve lift Liftin to the target valve lift Liftin_cmd is changed. More specifically, the follow-up speed becomes lower as the target value filter-setting parameter POLE_f_lf is closer to a value of $-1$. Therefore, by setting the target value filter-setting parameter POLE_f_lf to a value closer to a value of $-1$, the lift control input Uliftin for causing the valve lift Liftin to follow up the target valve lift Liftin_cmd becomes smaller, so that the current value Imot becomes smaller, and the driving force applied to the short arm 65 for causing the valve lift Liftin to the target valve lift Liftin_cmd becomes smaller.

Further, by changing the switching function-setting parameter POLE_lf within the range of $-1<$POLE_lf$<0$, the follow-up speed and the follow-up behavior of the follow-up error E_lf to a value of 0, i.e. the follow-up speed and the follow-up behavior of the valve lift Liftin to the target valve lift Liftin_cmd is changed. In other words, the degree of suppression of influence of disturbance applied to the lift actuator 60 (hereinafter simply referred to as "the disturbance suppression degree") is changed. More specifically, as the switching function-setting parameter POLE_lf is closer to a value of $-1$, the occurrence of a larger follow-up error E_lf is permitted, which causes reduction of the disturbance suppression degree. Therefore, by setting the switching function-setting parameter POLE_lf to a value closer to a value of $-1$, the lift control input Uliftin calculated when the follow-up error E_lf has occurred becomes smaller. As a result, the current value Imot becomes smaller, and the driving force applied to the short arm 65 for causing the valve lift Liftin to follow up the target valve lift Liftin_cmd becomes smaller.

Next, the abutment determination process in the step 53 in FIG. 14 will be described with reference to FIG. 16. The present process determines whether or not the short arm 65 of the variable valve lift mechanism 50 is in abutment with the minimum lift stopper 67a, and sets, according to the result of the determination, the switching function-setting parameter POLE_lf and the target value filter-setting parameter POLE_f_lf.

Figure 17:
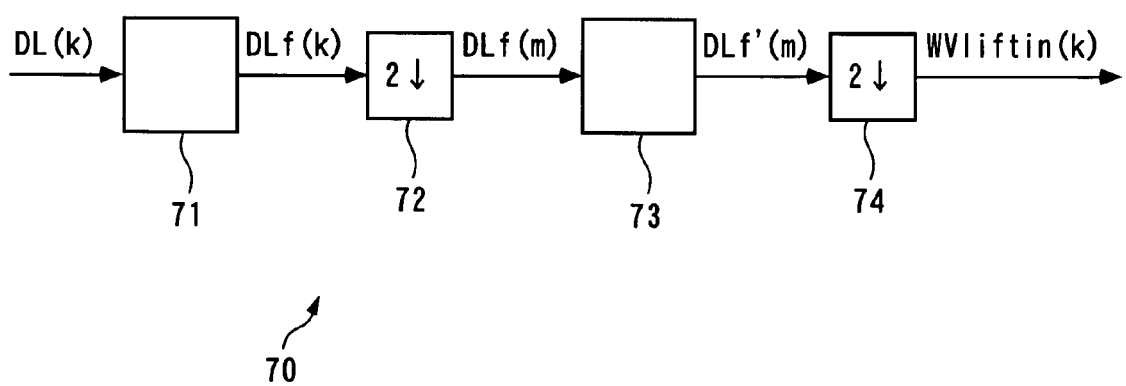
[FIG. 17]
A block diagram of a determination parameter-calculating section.

First, in a step 60, a determination parameter WVliftin is calculated. The determination parameter WVliftin is used for determining whether or not the short arm 65 is in abutment with the minimum lift stopper 67a, and is calculated based on a lift difference DL(k) by a determination parameter-calculating section 70 shown in FIG. 17. The lift difference DL(k) represents the difference (=Liftin(k)−Liftin(k−1)) between the present value Liftin(k) and the immediately preceding value Liftin(k−1) of the valve lift. It should be noted that the determination parameter-calculating section 70 is formed by the ECU 2.

The determination parameter-calculating section 70 includes a first filter 71, a first downsampler 72, a second filter 73, and a second downsampler 74.

Figure 18:
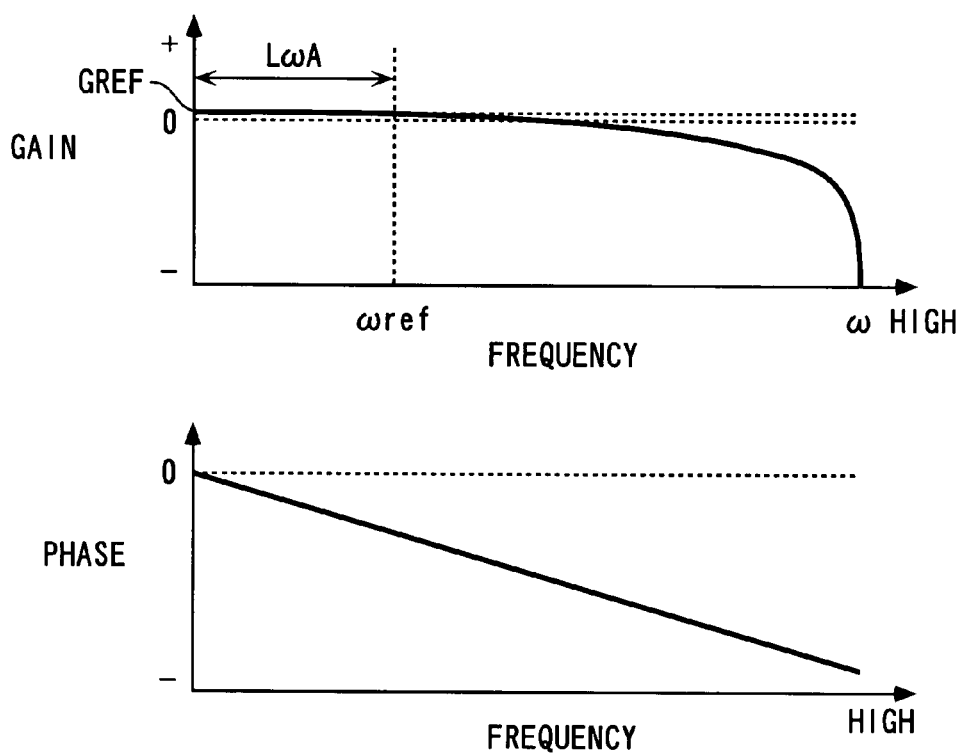
[FIG. 18]
A block diagram showing a gain characteristic and a phase characteristic of a first filter.
Figure 19:
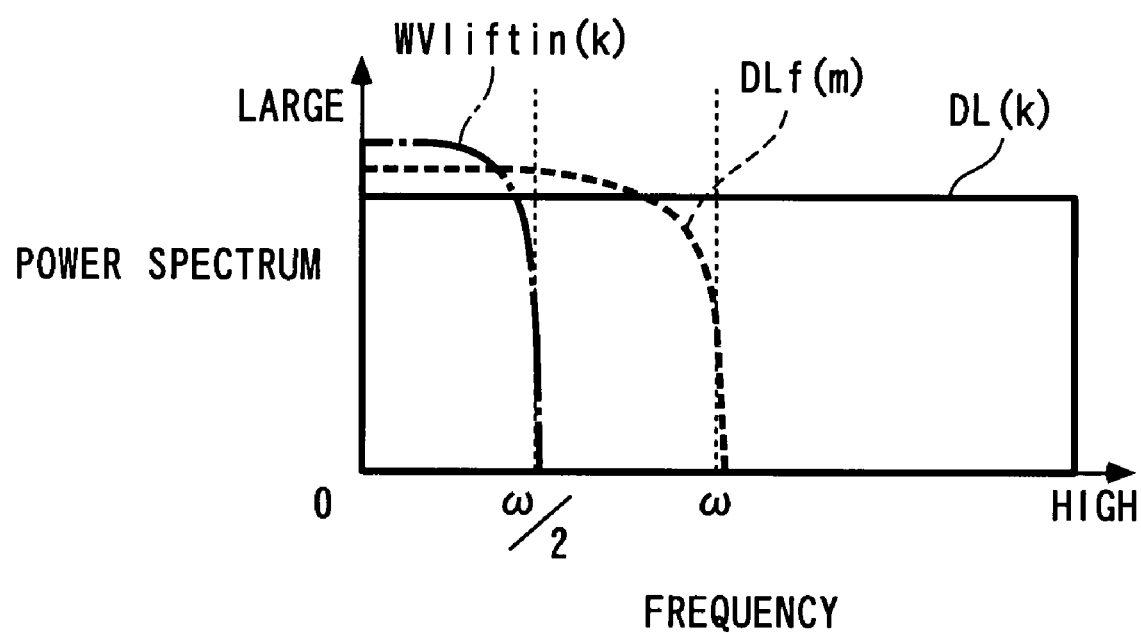
[FIG. 19]
A schematic diagram of a power spectrum of a lift difference DL(k), a first filtered value DLf(m), and a determination parameter WVliftin(k).

The first filter 71 is a low-pass filter which has a gain characteristic and a phase characteristic as shown in FIG. 18, and samples and filters the lift difference DL(k) whenever the aforementioned control period $\Delta T$ elapses, thereby generating a first filtered value DLf(k) to deliver the same to the first downsampler 72. More specifically, out of the lift difference DL(k), components in a frequency region not lower than a predetermined first frequency $\omega$ corresponding to ½ of the sampling frequency of the lift difference DL(k) are removed. Further, a gain for components of the lift difference DL(k) in a low frequency region L$\omega$A not higher than a predetermined frequency $\omega$ ref lower than the first frequency $\omega$ is set to a predetermined value GREF larger than a value of 1, whereby the components in the low frequency region L$\omega$A are amplified. It should be noted that the first filter value DLf(k) is calculated (generated) by the following equation (10):

$$DLf(k)=\alpha \cdot DL(k)+\alpha \cdot DL(k-1) \quad (10)$$

wherein $\alpha$ represents a predetermined value (e.g. 0.7071).

The first downsampler 72 thins out the first filtered value DLf(k) input thereto at the control period $\Delta T$ by sampling every second value thereof, and delivers the sampled first filtered value DLf(m) to the second filter 73.

The second filter 73 is configured substantially in the same manner as the first filter 70, and generates a second filtered value DLf'(m) by filtering the first filtered value DLf(m) input thereto to deliver the same to the second downsampler 74. More specifically, the second filter 73 removes from the first filtered value DLf(m) components thereof in a frequency region not lower than half the frequency corresponding to the repetition period of input of the first filtered value DLf(m), i.e. a predetermined second frequency $\omega$/2 which is equal to half the first frequency $\omega$. Further, a gain for components of the first filtered value DLf(m) in a low frequency region not higher than a predetermined frequency lower than the second frequency ω/2 is set to a predetermined value larger than a value of 1, whereby the components in this low frequency region are amplified. It should be noted that the second filtered value DLf'(m) is calculated (generated) by the following equation (11):

$$DLf'(m)=\alpha \cdot DLf(m)+\alpha \cdot DLf(m-1) \qquad (11)$$

The second downsampler 74 thins out the second filtered value DLf'(m) input thereto by sampling every second value thereof, and outputs the thinned value as a determination parameter WVliftin(k).

As described above, the determination parameter WVliftin is calculated (generated) by repeatedly carrying out the above-described filtering and thinning processes on the lift difference DL. With this configuration, the determination parameter WVliftin is calculated such that noise contained in components in the high frequency region is removed, and components in the lower frequency region of the lift difference DL are amplified, whereby it is obtained as a value improved in the SN ratio of the lift difference DL. Further, the aforementioned filtering process has a differentiation-like function, and hence the determination parameter WVliftin calculated as described above represents a differential value of the rate of change of the valve lift Liftin, i.e. an acceleration of the short arm 65 performing the pivotal motion.

Figure 14:
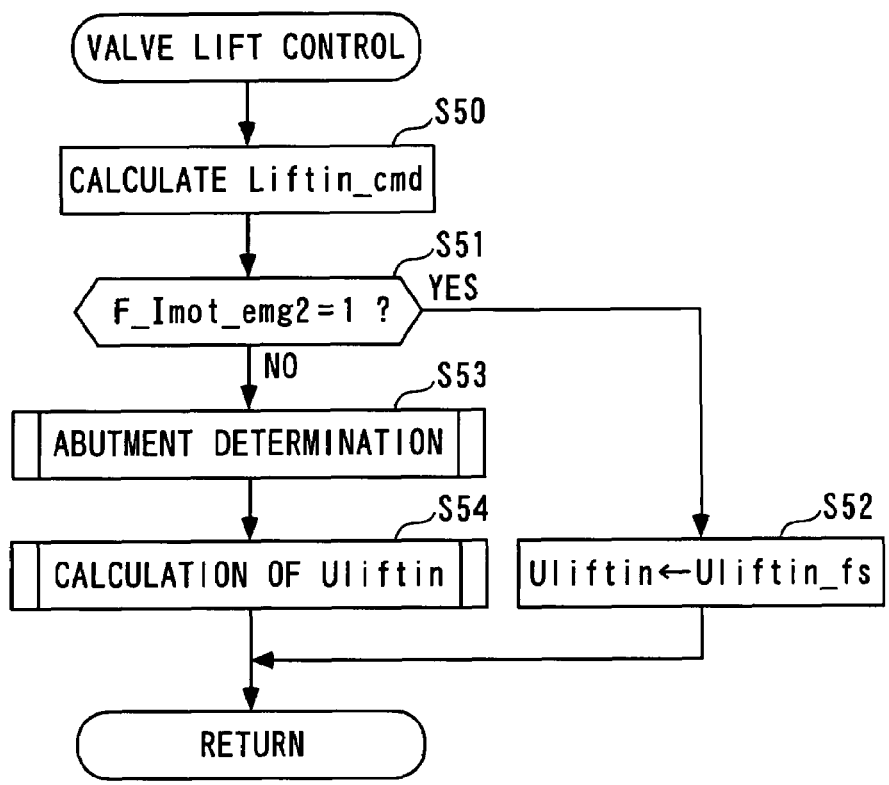
[FIG. 14]
A flowchart showing a valve lift control process in FIG. 10.
Figure 15:
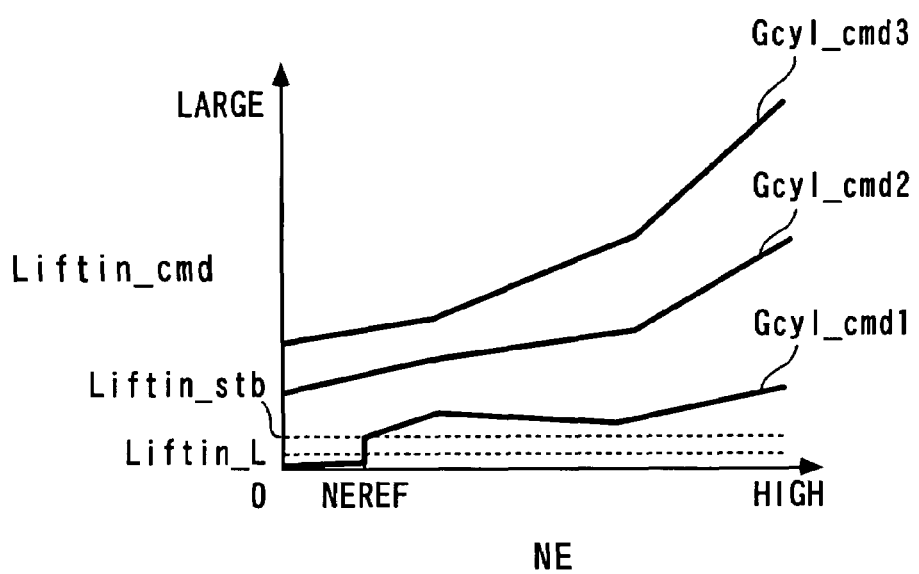
[FIG. 15]
A diagram showing, by way of example, a map for use in calculating a target valve lift Liftin_cmd, which is used in the FIG. 14 process.
Figure 16:
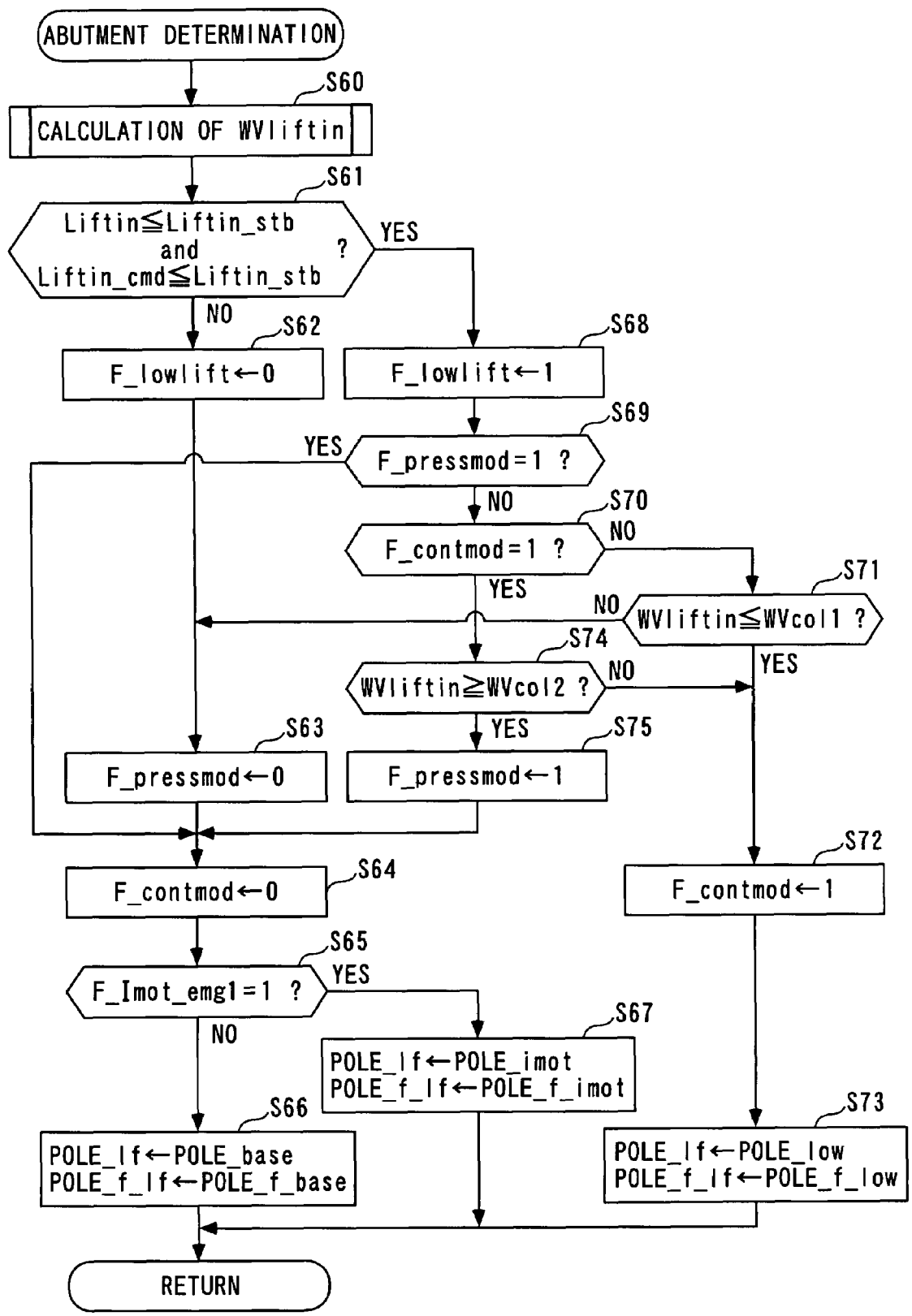
[FIG. 16]
A flowchart showing an abutment determination process in FIG. 14.

Referring to FIG. 16, in a step 61 following the step 60, it is determined whether or not the valve lift Liftin, and the target valve lift Liftin_cmd calculated in the step 50 in FIG. 14 are both not higher than the aforementioned predetermined value Liftin_stb.

If the answer to this question is negative (NO), in steps 62, 63, and 64, a low lift flag F_lowlift, a hold flag F_pressmod, and an abutment start flag F_contmod are reset to 0. Then, it is determined whether or not the first overcurrent determination flag F_Imot_emg1 set in the step 15 in FIG. 9 is equal to 1 (step 65).

If the answer to this question is negative (NO), the switching function-setting parameter POLE_lf and the target filter-setting parameter POLE_f_lf are set to predetermined normal-time values POLE_base and POLE_f_base (e.g. –0.4 and –0.9, respectively) (step 66), followed by terminating the present process.

On the other hand, if the answer to the question of the step 65 is affirmative (YES), which means F_Imot_emg1=1 holds, i.e. if the lift actuator 60 is in a state close to the overcurrent and overload condition, the switching function-setting parameter POLE_lf and the target filter-setting parameter POLE_f_lf are set to predetermined overcurrent-time values POLE_imot and POLE_f_imot (step 67), followed by terminating the present process.

The overcurrent-time value POLE_imot is set to a value closer to a value of –1 than the normal-time value POLE_base (–1<POLE_imot<POLE_base), and is equal to e.g. –0.8. Further, the overcurrent-time value POLE_f_imot of the target value filter-setting parameter is set to a value closer to a value of –1 than the normal-time value POLE_f_base (–1<POLE_f_imot<POLE_f_base), and is equal to e.g. –0.95. The overcurrent-time value POLE_f_imot is thus set because as the switching function-setting parameter POLE_lf and the target filter-setting parameter POLE_f_lf are closer to a value of –1, the current value Imot becomes smaller, and therefor to make use of this to thereby prevent the lift actuator 60 from entering the overcurrent/overloaded state.

On the other hand, if the answer to the question of the step 61 is affirmative (YES), i.e. if the valve lift Liftin and the target valve lift Liftin_cmd are both not higher than the predetermined value Liftin_stb, which means they are very small, in the following step 68 et seq., it is determined whether or not the short arm 65 is abutment with the minimum lift stopper 67a. First, in the step 68, assuming that the valve lift Liftin is set toward the low lift side, to indicate this, the low lift flag F_lowlift is set to 1.

Next, in steps 69 and 70, it is determined whether or not the hold flag F_pressmod and the abutment start flag F_contmod are equal to 1, respectively. If both of the answers to these questions are negative (NO), it is determined whether or not the determination parameter WVliftin calculated in the step 60 is not higher than a predetermined first reference value WVcol1 (e.g. –3) (step 71).

If the answer to this question is negative (NO), the step 63 et seq. are executed. On the other hand, if the answer to the question of the step 71 is affirmative (YES), i.e. if the determination parameter WVliftin becomes not larger than the first reference value WVcol1, it is determined that the short arm 66 has begun to abut against the minimum lift stopper 67a. The determination is thus made because since the determination parameter WVliftin represents the acceleration of the short arm 65 performing pivotal motion, and hence satisfaction of the relationship of WVliftin≦WVcol1 makes it possible to presume that the short arm 65 has begun to abut against the minimum lift stopper 67a, which has caused reduction of the acceleration of the short arm 65. Next, to indicate that the short arm 65 has begun to abut against the minimum lift stopper 67a, the abutment start flag F_contmod is set to 1 (step 72). Next, in response to the determination, the switching function-setting parameter POLE_lf and the target value filter-setting parameter POLE_f_lf are set to respective predetermined abutment start-time values POLE_low and POLE_f_low (step 73), followed by terminating the present process.

The abutment start-time value POLE_low is set to a value close to a value of –1 than the aforementioned overcurrent-time value POLE_imot (–1<POLE_low<POLE_imot<POLE_base), and is equal to e.g. –0.99. Further, the abutment start-time value POLE_f_low of the target value filter-setting parameter is set to a value closer to a value of –1 than the aforementioned overcurrent-time value POLE_f_imot (–1<POLE_f_low<POLE_f_imot<POLE_f_base), and is equal to e.g. –0.97.

When the abutment start flag F_contmod is set to 1 in the step 72, the answer to the question of the step 70 becomes affirmative (YES), and in this case, it is determined whether or not the determination parameter WVliftin is not lower than a second reference value WVcol2 (e.g. –3) (step 74).

If the answer to this question is negative (NO), the step 72 et seq. are executed. On the other hand, if the answer to this question is affirmative (YES), which means that the determination parameter WVliftin becomes not lower than the second reference value WVcol2, i.e. the determination parameter having become not higher than the first reference value WVcol1 becomes not lower than the second reference value WVcol2, it is determined that the acceleration of the short arm 65 has passed its peak and the abutting motion of the short arm 65 against the minimum lift stopper 67a is terminated whereby the valve lift Liftin is held at the minimum value Liftin_L. Then, to indicate this, the hold flag F_pressmod is set to 1 (step 75). Next, the step 64 et seq. are executed. Further, when the hold flag F_pressmod is set to 1 in the step 75, the answer to the question of the step 69 becomes affirmative (YES), and in this case, the step 64 et seq. are executed.

Figure 20:
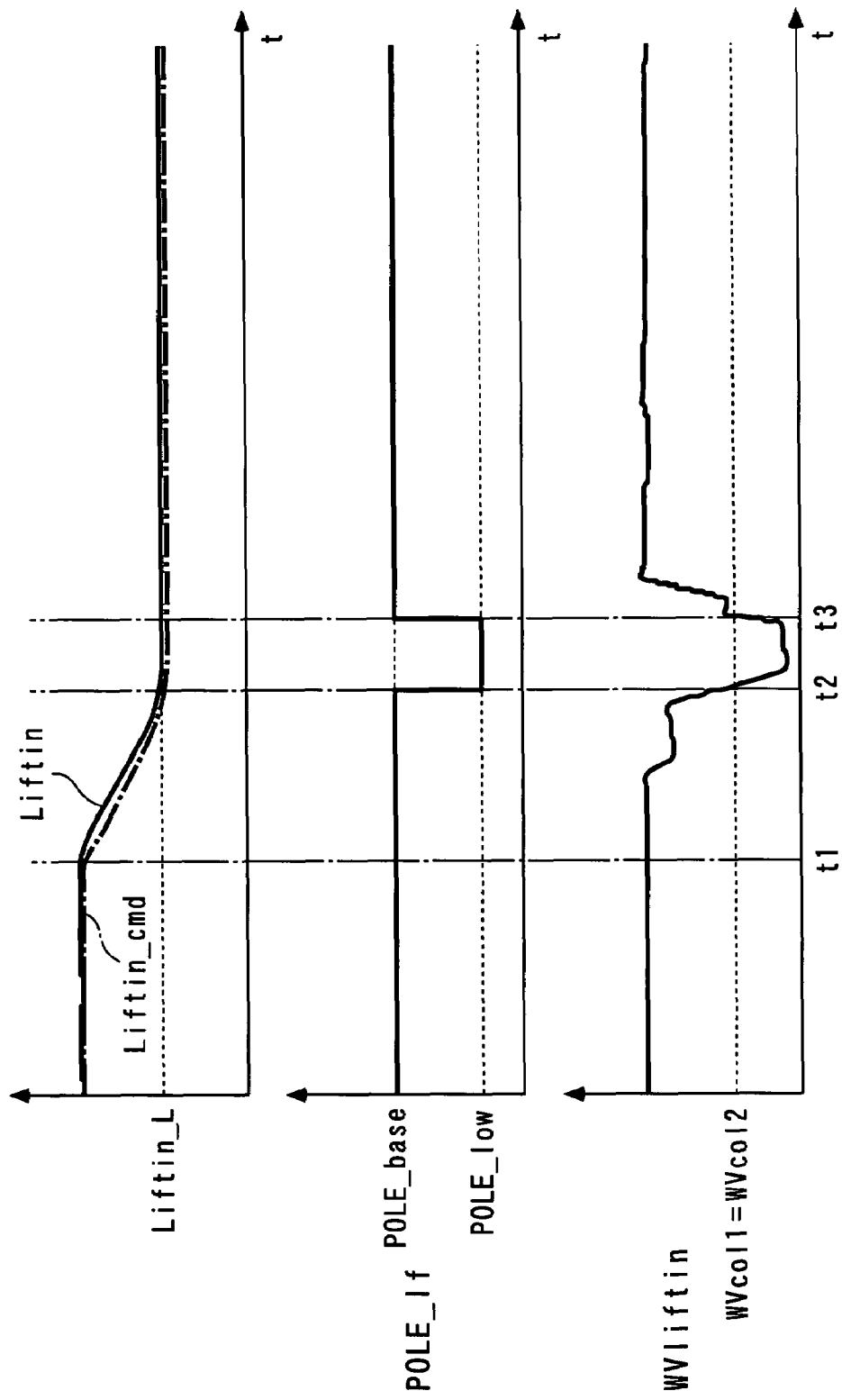
[FIG. 20]
A diagram illustrating an example of operation of the abutment determination process.

FIG. 20 shows an example of the operation of the system during the execution of the aforementioned abutment determination process. This example shows an operation of the system in the case the where the first and second reference values WVcol1 and WVclo2 are set to the same value, and the valve lift Liftin is controlled such that it is changed from the state converged to the target valve lift Liftin_cmd to the minimum value Liftin_L in accordance with reduction of the target valve lift Liftin_cmd.

As shown in FIG. 20, when the target valve lift Liftin_cmd begins to be reduced (time point t1), the valve lift Liftin is reduced such that it converges to the target valve lift Liftin_cmd. Then, when the valve lift Liftin becomes close to the minimum value Liftin_L, the determination parameter WVliftin begins to drop suddenly. Further, when the valve lift Liftin is reduced to the minimum value Liftin_L and the short arm 65 has begun to abut against the minimum lift stopper 67a, the determination parameter WVliftin becomes lower than the first reference value WVcol1 (time point t2). Therefore, when WVliftin≦WVcol1 holds (Yes to the step 71), it can be determined that the short arm 65 has begun to abut against the minimum lift stopper 67a. Further, in accordance therewith, the switching function-setting parameter POLE_lf having been set to the normal-time value POLE_base is set to the abutment start-time value POLE_low closer to a value of −1 (step 73).

Further, when the abutting motion of the short arm 65 against the minimum lift stopper 67a is terminated, whereby the valve lift Liftin is held at the minimum value Liftin_L, the determination parameter WVliftin increases from the reduced state to become larger than the second reference value WVcol2 (time point t3). Therefore, when the determination parameter WVliftin becomes not larger than the first reference value WVcol1 and then becomes not smaller than the second reference value WVcol2 (Yet to the step 74), it can be determined that the valve lift Liftin is held at the minimum lift value Liftin_L. Further, in accordance therewith, the switching function-setting parameter POLE_lf having been set to the abutment start-time value POLE_low is set to the normal-time value POLE_base (step 66).

As described hereinabove, according to the abutment determination process, when the valve lift Liftin is larger than the predetermined value Liftin_stb (NO to the step 61), i.e. when the intake air amount is to be controlled mainly by the valve lift Liftin without holding the valve lift Liftin at the minimum value Liftin_L, the switching function-setting parameter POLE_lf and the target value filter-setting parameter POLE_f_lf are set to the respective normal-time values POLE_base and POLE_f_base which are close to a value of 0 (step 66), whereby an excellent follow-up characteristic of the valve lift Liftin to the target valve lift Liftin_cmd is ensured.

Further, when it is determined that the short arm 65 has begun to abut against the minimum lift stopper 67a (YES to the step 71), the switching function-setting parameter POLE_lf and the target value filter-setting parameter POLE_f_lf are set to the respective start-time values POLE_low and POLE_f_low (step 73).

As described hereinabove, the start-time values POLE_low and POLE_f_low are set to respective values closer to a value of −1 than the normal-time values POLE_base and POLE_f_base. From this, when the short arm 65 has begun to abut against the minimum lift stopper 67a, as is apparent from the characteristic of the aforementioned target filter-type two-degree-of-freedom sliding mode control algorithm, the driving force applied to the short arm 65 for causing the valve lift Liftin to follow up the target valve lift Liftin_cmd can be reduced. As a result, it is possible to reduce impact occurring when the short arm 65 abuts against the minimum lift stopper 67a, and therefore prevent the short arm 65 and the minimum lift stopper 67a from being deformed, and hence to prolong the service life of the variable valve lift mechanism 50.

Further, the driving force applied to the short arm 65 can be secured until the short arm 65 abuts against the minimum lift stopper 67a, it is possible to control the intake air amount to a proper value quickly without lowering the follow-up speed of the valve lift Liftin to the target valve lift Liftin_cmd. As a result, it is possible to secure a stable operating condition of the engine 3, to thereby secure excellent drivability. Further, it is not required to additionally provide the short arm 65 and the minimum lift stopper 67a with cushioning members, which makes it possible to prevent the intake air amount from being varied due to variations in the valve lift Liftin at the minimum value Liftin_L, differently from the case of the cushion members being provided, and prevent the addition of the cushioning members from increasing the manufacturing cost or reducing the degree of freedom of design.

Further, after it is determined that the short arm 65 has abutted against the minimum lift stopper 67a, when it is determined that the valve lift Liftin is held at the minimum value Liftin_L (YES to the step 74), the switching function-setting parameter POLE_lf and the target filter-setting parameter POLE_f_lf are set to the respective normal-time values POLE_base and POLE_f_base (step 66). This causes an increase in the driving force applied to the short arm 65 for causing the valve lift Liftin to follow up the target valve lift Liftin_cmd, i.e. the force for holding the valve lift Liftin at the minimum value Liftin_L. As a result, after abutting against the minimum lift stopper 67a, the short arm 65 can be positively held in the state in abutment with the minimum lift stopper 67a without being moved away from the minimum lift stopper 67a by the vibration of the engine 3 or the like.

Further, during a time period from the start of abutment of the short arm 65 against the minimum lift stopper 67a to the end thereof, the target valve lift Liftin_cmd is set to a larger value than the predetermined value Liftin_stb, and when the valve lift Liftin is caused to increase, the answer to the question of the step 61 becomes negative (NO), so that the step 66 is executed. As a result, when the switching function-setting parameter POLE_lf and the target value filter-setting parameter POLE_f_lf are set to the respective normal-time values POLE_base and POLE_f_base.

This makes it possible, as described hereinabove, to instantly increase the driving force applied to the short arm 65 from the state reduced hitherto, when the valve lift Liftin is increased e.g. by a driver's demand of acceleration immediately after the short arm 65 has begun to abut against the minimum lift stopper 67a. As a result, it is possible to improve the follow-up characteristic of the valve lift Liftin to the target valve lift Liftin_cmd, and hence increase the intake air amount to a suitable value quickly. Therefore, it is possible to secure excellent drivability.

Further, since the abutment determination is performed using the determination parameter WVliftin representative of the acceleration of the short arm 65 which varies according to the actual abutment state of the short arm 65 against the minimum lift stopper 67a, the determination can be performed with accuracy without being influenced by differences between individual products of the short arm 65 and the minimum lift stopper 67a and wear caused by aging thereof, differently from the case where the determination is carried out based on the position of the short arm 65 directly detected by a sensor or the like. Further, as described hereinabove, since the determination parameter WVliftin is obtained as a value improved in the SN ratio of the lift difference DL, it is possible to carry out the abutment determination even more accurately while suppressing influence of nose contained in the lift difference DL.

Figure 21:
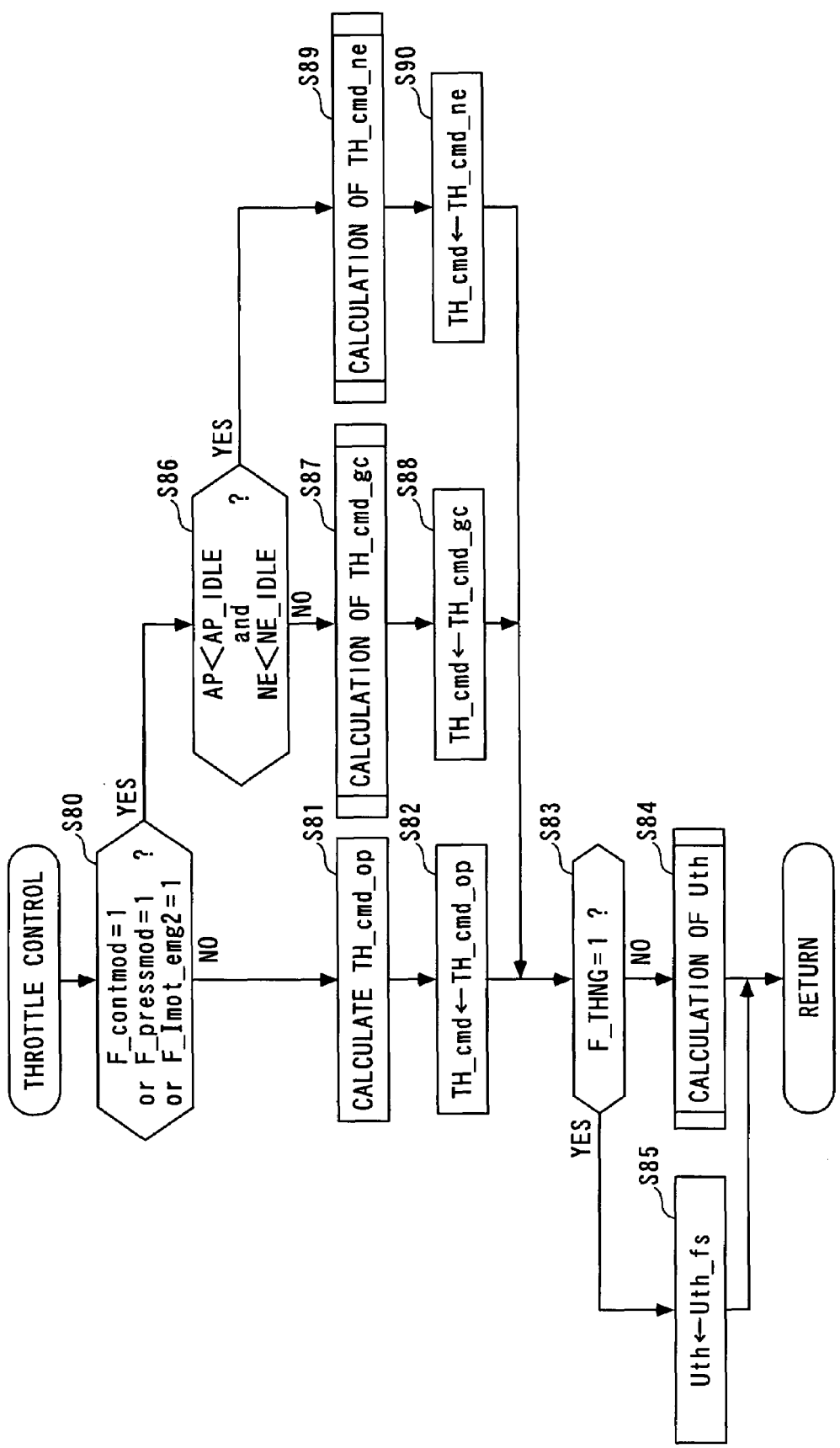
[FIG. 21]
A flowchart showing a throttle control process in FIG. 10.

Next, the throttle control process in the step 34 in FIG. 10 will be described with reference to FIG. 21. First, in a step 80, it is determined whether or not any of the abutment start flag F_contmod, the hold flag F_pressmod, and the second overcurrent determination flag F_Imot_emg2, mentioned above, is equal to 1.

Figure 22:
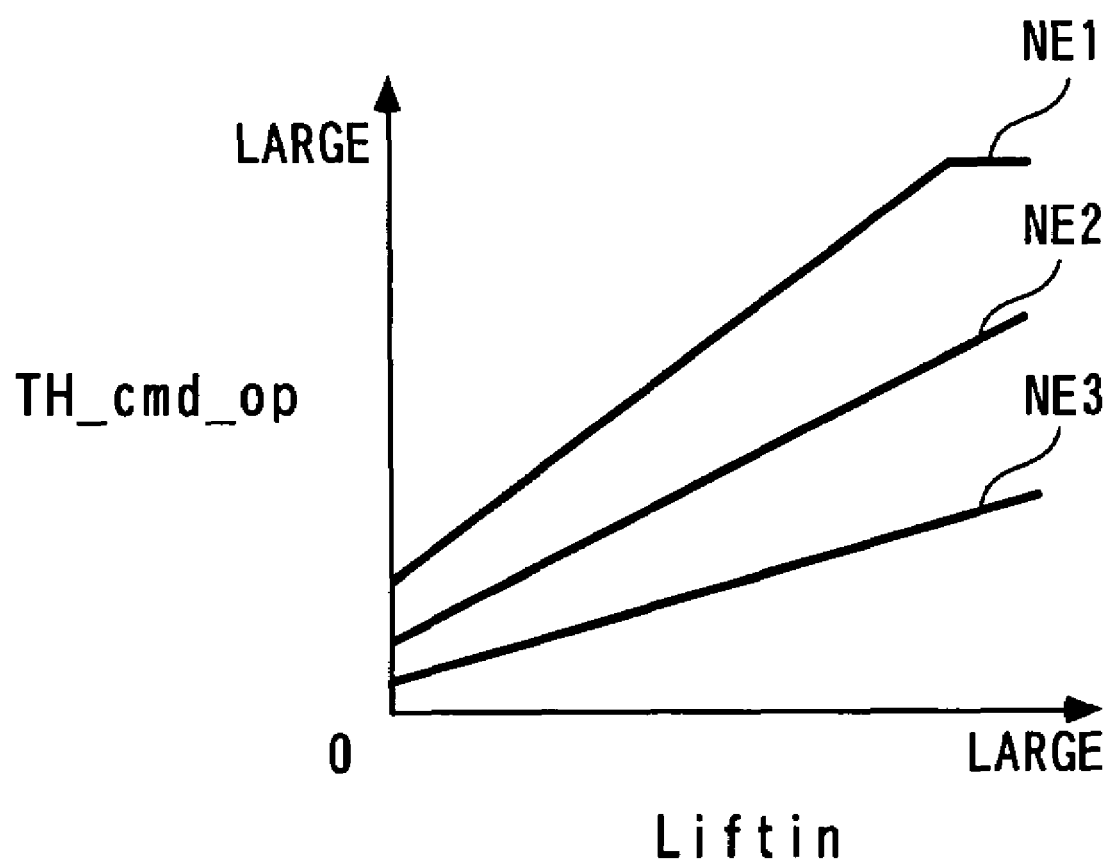
[FIG. 22]
A diagram showing, by way of example, a map for use in calculating a normal-time value TH_cmd_op of a target throttle valve opening for use in the FIG. 21 process.

If the answer to this question is negative (NO), i.e. if all of the abutment start flag F_contmod, the hold flag F_pressmod, and the second overcurrent determination flag F_Imot_emg2 are equal to 0, i.e. the short arm 65 is not in contact with the minimum lift stopper 67a but the intake air amount control mainly based on the valve lift Liftin is being executed, a normal-time value TH_cmd_op of the target throttle valve opening is calculated by searching a map shown in FIG. 22 according to the valve lift Liftin and the engine speed NE (step 81). In FIG. 22, NE1 to NE3 represent first to third predetermined values (NE1>NE2>NE3) of the engine speed NE. It should be noted that the normal-time value TH_cmd_op is calculated by interpolation when the engine speed NE is equal to a value other than the first to third predetermined values NE1 to NE3.

Further, in the above map, as the valve lift Liftin is larger or the engine speed NE is higher, the normal-time value TH_cmd_op is set to a larger value. This is because load on the engine 3 is higher as the valve lift Liftin is larger or the engine speed NE is higher, and hence the larger intake air amount is demanded.

Next, the target throttle valve opening TH_cmd is set to the normal-time value TH_cmd_op (step 82). Next, it is determined whether or not a throttle failure flag F_THNG is equal to 1 (step 83). The throttle failure flag F_THNG set to 1 in a failure determination process (not shown), when it is determined that the throttle valve mechanism 11 is faulty.

If the answer to the question of the step 83 is negative (NO), i.e. if the throttle valve mechanism 11 is normal, the throttle control input Uth is calculated with the target value filter-type two-degree-of-freedom sliding mode control algorithm expressed by the following equations (12) to (15), such that the throttle valve opening TH follows up and converges to the target throttle valve opening TH_cmd (step 84), followed by terminating the present process.

[Math. 3]

$$Uth(k) = -Krch\_th \cdot \sigma\_th(k) - Kadp\_th \cdot \sum_{i=0}^{k} \sigma\_th(i) \quad (12)$$

$$\sigma\_th(k) = E\_th(k) + pole\_th \cdot E\_th(k-1) \quad (13)$$

$$E\_th(k) = TH(k) - TH\_cmd\_f(k) \quad (14)$$

$$TH\_cmd\_f(k) = \quad (15)$$
$$-pole\_f\_th \cdot TH\_cmd\_f(k-1) + (1 + pole\_f\_th) \cdot TH\_cmd(k)$$

In the equation (12), Krch_th represents a predetermined reaching law gain, and Kadp_th represents a predetermined adaptive law gain, while σ_th is a switching function defined as in the equation (13). Further, in the equation (13), E_th is a follow-up error calculated by the equation (14). Further, in the equation (14), TH_cmd_f is a filtered vale of the target throttle vale opening TH_cmd, and is calculate with a target value filter algorithm (first-order lag filter algorithm) expressed by the equation (15).

On the other hand, if the answer to the question of the step 83 is affirmative (YES), which means F_THNG=1 holds, i.e. if the throttle valve opening mechanism 11 is faulty, the throttle control input Uth is set to the aforementioned failure-time value Uth_fs (step 85), followed by terminating the present process. This causes the throttle valve opening TH to be held at the minimum value TH_L, as described above, whereby the idling operation or the starting of the engine can be properly carried out during stoppage of the vehicle, and during travel of the vehicle, it is possible to maintain the low-speed traveling state.

On the other hand, if the answer to the question of the step 80 is affirmative (YES), which means the any of the of the abutment start flag F_contmod, the hold flag F_pressmod, and the second overcurrent determination flag F_Imot_emg2 are equal to 1, i.e. the short arm 65 has begun to abut against the minimum lift stopper 67a or the valve lift Liftin has been held at the minimum value Liftin_L, it is determined whether or not the accelerator opening AP and the engine speed NE are smaller than respective predetermined value AP_IDLE and NE_IDLE for determination of idling (step 86).

Figure 10:
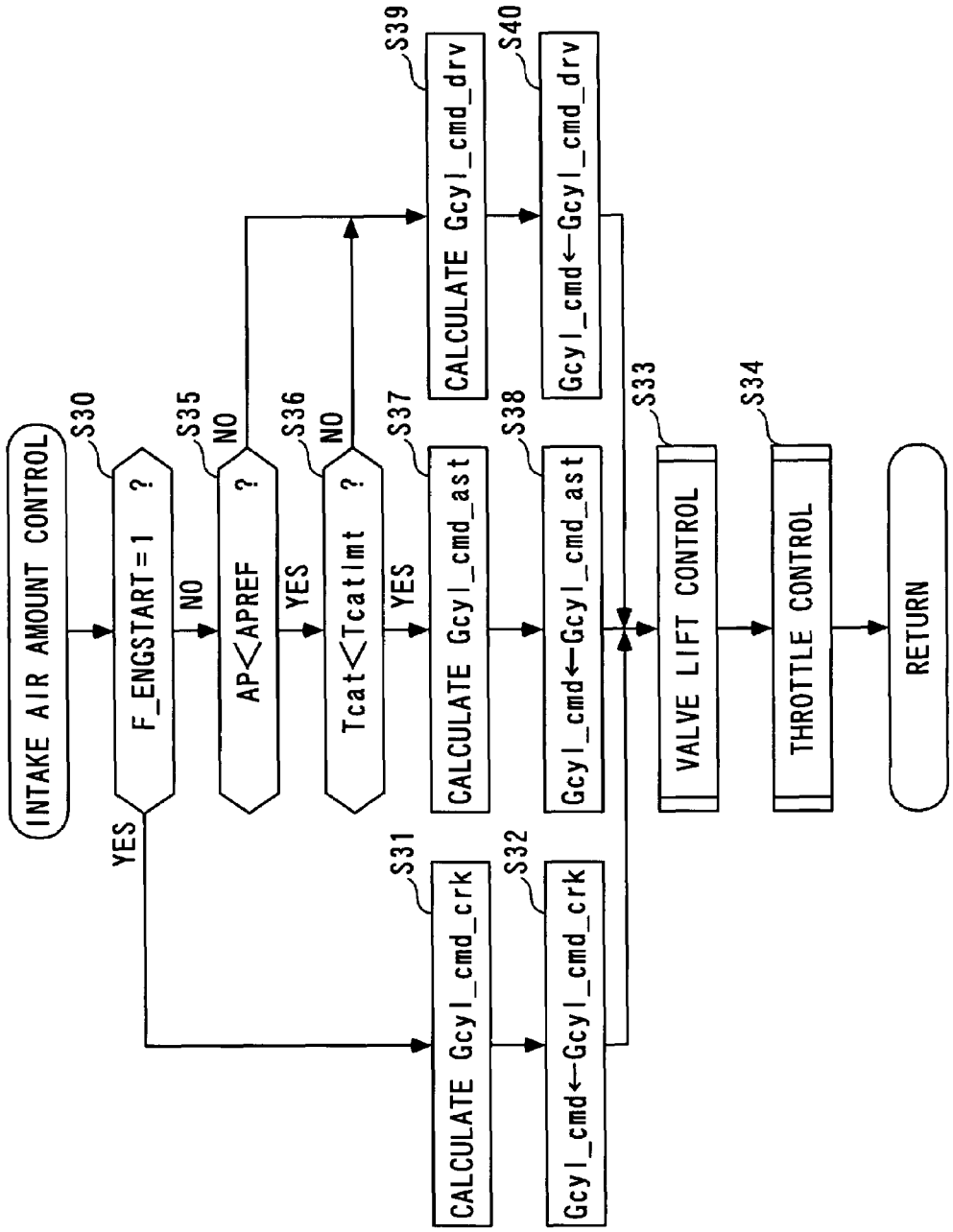
[FIG. 10]
A flowchart showing an intake air amount control process in FIG. 8.

If the answer to this question is negative (NO), i.e. the engine 3 is in an operating condition other idling, a lift hold-time value TH_cmd_gc of the target throttle valve opening is calculated with a target value filter-type two-degree-of-freedom sliding mode control algorithm expressed by the following equations (16) to (19), such that the actual intake air amount Gcyl converges to the target intake air amount Gcyl_cmd set in the step 32, 38 or 40 in FIG. 10 (step 87). Then, the target throttle valve opening TH_cmd is set to the lift hold-time value TH_cmd_gc (step 88), and then the step 83 et seq. are executed. It should be noted that the actual intake air amount Gcyl is calculated using the TH passing intake air amount Gth, the intake pipe absolute pressure PBA, and the intake air temperature TA by the following equation (20):

[Math. 4]

$$TH\_cmd\_gc(k) = -Krch\_gc \cdot \sigma\_gc(k) - Kadp\_gc \cdot \sum_{i=0}^{k} \sigma\_gc(i) \quad (16)$$

$$\sigma\_gc(k) = E\_gc(k) + pole\_gc \cdot E\_gc(k-1) \quad (17)$$

$$E\_gc(k) = Gcyl(k) - Gcyl\_cmd\_f(k) \quad (18)$$

$$Gcyl\_cmd\_f(k) = \quad (19)$$
$$-pole\_f\_gc \cdot Gcyl\_cmd\_f(k-1) + (1 + pole\_f\_gc) \cdot Gcyl\_cmd(k)$$

[Math. 5]

$$Gcyl(k) = Gth(k) - \frac{VB \cdot [PBA(k) - PBA(k-1)]}{R \cdot TA} \quad (20)$$

In this equation (20), VB represents an intake pipe internal volume, and R represents a predetermined gas constant. Further, in the above equation (16), Krch_gc represents a predetermined reaching law gain, and Kadp_gc represents a predetermined adaptive law gain, while σ_gc is a switching function defined as in the equation (17). Further, in the equation (17), E_gc is a follow-up error calculated by the equation (18). Further, in the equation (18), Gcyl_cmd_f represent a filtered value of the target intake air amount Gycl_cmd, and is calculated with a target filter algorithm (first-order lag filter algorithm) expressed by the equation (19).

On the other hand, if the answer to the question of the step 86 is affirmative (YES), i.e. if the engine 3 is idling, an idle-time value TH_cmd_ne of the target throttle valve opening is calculated with a target value filter-type two-degree-of-freedom sliding mode control algorithm expressed by the following equations (21) to (24) such that the engine speed NE follows up and converges to a predetermined target engine speed NE_cmd (e.g. 650 rpm) (step 89). Next, the target throttle valve opening TH_cmd is set to the idle-time value TH_cmd_ne (step 90), and then the step 83 et seq. are executed.

[Math. 6]

$$\text{TH\_cmd\_ne}(k) = -\text{Krch\_ne} \cdot \sigma\_\text{ne}(k) - \text{Kadp\_ne} \cdot \sum_{i=0}^{k} \sigma\_\text{ne}(i) \quad (21)$$

$$\sigma\_\text{ne}(k) = E\_\text{ne}(k) + \text{pole\_ne} \cdot E\_\text{ne}(k-1) \quad (22)$$

$$E\_\text{ne}(k) = NE(k) - \text{NE\_cmd\_f}(k) \quad (23)$$

$$\text{NE\_cmd\_f}(k) = \quad (24)$$
$$-\text{pole\_f\_ne} \cdot \text{NE\_cmd\_f}(k-1) + (1+\text{pole\_f\_ne}) \cdot \text{NE\_cmd}(k)$$

In this equation (21), Krch_ne represents a predetermined reaching law gain, and Kadp_ne represents a predetermined adaptive law gain, while σ_ne is a switching function defined as in the equation (22). Further, in the equation (22), E_ne is a follow-up error calculated by the equation (23). Further, in the equation (23), NE_cmd_f represent a filtered value of the target engine speed NE_cmd, and is calculated with a target value filter algorithm (first-order lag filter algorithm) expressed by the equation (24).

As described above, when the valve lift Liftin is equal to the minimum value Liftin_L (YES to the step 80), the throttle valve opening TH is controlled according to the target intake air amount Gcyl_cmd calculated based on the operating condition of the engine represented by the engine speed NE and the accelerator opening AP (steps 87, 88, and 84), whereby the intake air amount control mainly based on the throttle valve opening TH is carried out. Further, the control of the intake air amount is started immediately after it is determined that the short arm 65 has begun to abut against the minimum lift stopper 67a (YES to the step 80). This makes it possible to perform a smooth transition from the intake air amount control mainly based on the valve lift Liftin to the intake air amount control mainly based on the throttle valve opening TH, without interrupting the control.

Further, during execution of the intake air amount control mainly based on the valve lift Liftin (NO to the step 80), in parallel therewith, the throttle valve opening TH is controlled according to the valve lift Liftin (steps 81, 82 and 84). Thus, at a time point the intake air mount control mainly based on the throttle valve opening TH is started, the throttle valve opening TH has already been controlled to a value suitable for the valve lift Liftin, and hence, at this start, the throttle valve opening TH can be quickly changed to a proper value without drastically changing the same. This makes it possible to smoothly change the intake air amount, and hence the engine speed NE and the torque of the engine 3 can be smoothly changed without any step.

As described heretofore, according to the present embodiment, the lift control input Uliftin is calculated with the target value filter-type two-degree-of-freedom sliding mode control algorithm, and hence the target filter algorithm thereof enables the follow-up speed of the valve lift Liftin to the target valve lift Liftin_cmd to be properly set, and the feedback control algorithm thereof enables the follow-up behavior of the valve lift Liftin to the target valve lift Liftin_cmd to be properly set. This makes it possible to cause the valve lift Liftin to accurately follow up the target valve lift Liftin_cmd while avoiding the occurrence of overshooting. As a result, the impact occurring when the short arm 65 abuts against the minimum lift stopper 67a can be positively reduced.

It should be noted that the present invention is not limited to the above-described embodiment, but it can be practiced in various forms. For example, although in the present embodiment, the present invention is applied to the minimum lift stopper 67a, by way of example, it may be applied to the maximum lift stopper 67b. Further, the present invention may be applied to a variable valve lift mechanism including one restriction part or three or more restriction parts on the maximum side or the minimum side. For example, the present invention may be applied to one in which a retractable stopper is disposed at an intermediate location between the minimum lift stopper 67a and the maximum lift stopper 67b within the movable range of the short arm 65.

Further, in the present embodiment, as the variable intake air mechanism, there is used the throttle valve mechanism 11, this is not limitative, but the use of any other suitable mechanism is also within the scope of the resent invention insofar as it is capable of changing the intake air amount. Further, in the present embodiment, the target value filter-type two-degree-of-freedom sliding mode control algorithm is used as the predetermined control algorithm for calculating the lift control input Uliftin such that the valve lift Liftin follows up the target valve lift Liftin_cmd, by way of example, this is not limitative, but the predetermined control algorithm may be any algorithm insofar as it is capable of calculating the lift control input Uliftin such that the valve lift Liftin follows up the target valve lift Liftin_cmd. For example, a general feedback control algorithm, such as a PID control algorithm, may be employed.

Further, in the present embodiment, the target value filter-type two-degree-of-freedom sliding mode control algorithm is employed as the two-degree-of-freedom control algorithm, it is to be understood that the two-degree-of-freedom control algorithm is not limited to this. For example, as the two-degree-of-freedom control algorithm, there may be employed a target value filter algorithm, such as a first-order lag filter algorithm, combined with a feedback control algorithm, such as a PID control algorithm.

Further, although in the present embodiment, the switching function-setting parameter POLE_lf is set to the normal-time value POLE_base in both of the case where it is determined that the valve lift Liftin is held at the minimum value Liftin_L and the case where the valve lift Liftin or the target valve lift Liftin_cmd is larger than the predetermined value Liftin_stb, this is not limitative, but it may be set to different values in the respective cases. For example, in the former case, since the driving force for holding the valve lift Liftin at the minimum value Liftin_L is not so necessary, and the switching function-setting parameter POLE_lf may be set such that the disturbance suppression degree is made smaller, than in the latter case.

Further, although in the present embodiment, after it is determined that the short arm 65 has abutted against the minimum lift stopper 67a, to set the switching function-setting parameter POLE_lf such that the disturbance suppression degree is increased, the predetermined value Liftin_stb is used as the reference value for being compared with the valve lift Liftin or the target valve lift Liftin_cmd, this is not limitative, but the minimum lift value Liftin_L may be used. Besides, details of the configuration of the present embodiment may be changed or modified without departing from the spirit and scope of the present invention.

INDUSTRIAL APPLICABILITY

The control system according to the invention is very useful for an internal combustion engine, in reducing impact occurring when a movable part of a variable valve lift mechanism of the engine abuts against a restriction part of the same, while ensuring excellent drivability.

The invention claimed is:

1. A control system for an internal combustion engine, comprising:
   a variable valve lift mechanism that changes a valve lift which is a lift of an intake valve of the engine by driving a movable part thereof, and includes a restriction part for having said movable part abut thereagainst, for thereby restricting the valve lift such that the valve lift does not exceed a predetermined limit lift;
   a variable intake air amount mechanism that changes an intake air amount of the engine;
   operating condition-detecting means for detecting an operating condition of the engine;
   abutment determination means for determining whether or not said movable part is in abutment with said restriction part;
   control means for controlling said variable intake air amount mechanism based on the detected operating condition of the engine, when said abutment determination means determines that said movable part is in abutment with said restriction part;
   valve lift-detecting means for detecting the valve lift;
   target valve lift-determining means for determining a target valve lift; and
   control input-calculating means for calculating a control input for controlling said variable valve lift mechanism with a predetermined control algorithm such that the detected valve lift follows up the determined target valve lift;
   wherein said predetermined control algorithm includes a disturbance suppression parameter for suppressing influence of disturbance applied to said variable valve lift mechanism, and
   wherein said control input calculating means includes disturbance suppression parameter-setting means for setting the disturbance suppression parameter such that a degree of suppression of the influence of the disturbance by the disturbance suppression parameter is made smaller when a determination that said movable part is in abutment with said restriction part is made than before the determination is made.

2. A control system as claimed in claim 1, wherein said control means starts control of said variable intake air amount mechanism immediately after it is determined that said movable part has abutted against said restriction part.

3. A control system as claimed in claim 1, wherein said control means controls said variable intake air amount mechanism according to the detected valve lift, when it is determined that said movable part is not in abutment with said restriction part.

4. A control system as claimed in claim 1, wherein said predetermined control algorithm includes a predetermined two-degree-of-freedom control algorithm.

5. A control system as claimed in claim 1, further comprising hold determination means for determining whether or not the valve lift is held at the predetermined limit lift after it is determined that said movable part has abutted against said restriction part, and
   wherein said disturbance suppression parameter-setting means sets the disturbance suppression parameter such that the degree of suppression of the influence of the disturbance by the disturbance suppression parameter is increased, when said hold determination means has determined that the valve lift is held at the predetermined limit lift.

6. A control system as claimed in claim 1, wherein said disturbance suppression parameter-setting means sets the disturbance suppression parameter such that the degree of suppression of the influence of the disturbance by the disturbance suppression parameter is increased, when at least one of the target valve lift and the valve lift is within a predetermined range defined by the predetermined limit lift and at the same time becomes equal to a value other the predetermined limit lift, after it is determined that said movable part has abutted against said restriction part.

* * * * *